(12) United States Patent
Joseph et al.

(10) Patent No.: US 10,593,220 B2
(45) Date of Patent: Mar. 17, 2020

(54) SYSTEMS AND METHODS FOR BIAS-SENSITIVE CROWD-SOURCED ANALYTICS

(71) Applicant: Regina Joseph, New York, NY (US)

(72) Inventors: Regina Joseph, New York, NY (US); Pavel Atanasov, Brooklyn, NY (US)

(73) Assignee: Regina Joseph, New York, NY (US)

( * ) Notice: Subject to any disclaimer, the term of this patent is extended or adjusted under 35 U.S.C. 154(b) by 149 days.

(21) Appl. No.: 15/493,612

(22) Filed: Apr. 21, 2017

(65) Prior Publication Data

US 2017/0309193 A1    Oct. 26, 2017

Related U.S. Application Data

(60) Provisional application No. 62/325,462, filed on Apr. 21, 2016.

(51) Int. Cl.
*G09B 5/02*   (2006.01)
*G06N 7/00*   (2006.01)

(52) U.S. Cl.
CPC ..................... *G09B 5/02* (2013.01)

(58) Field of Classification Search
CPC ....................................................... G09B 5/02
See application file for complete search history.

(56) References Cited

U.S. PATENT DOCUMENTS

| | | | |
|---|---|---|---|
| 7,424,488 B2 | 9/2008 | Aggarwal et al. | |
| 7,644,056 B2 | 1/2010 | Khalsa | |
| 7,720,787 B2 | 5/2010 | Pope et al. | |
| 7,761,409 B2 | 7/2010 | Stefik et al. | |
| 7,761,809 B2 | 7/2010 | Bukovec et al. | |
| 7,917,535 B1 | 3/2011 | Gregory et al. | |
| 7,966,254 B2 | 6/2011 | Cavey | |
| 8,015,495 B2 * | 9/2011 | Achacoso | G06Q 10/10 709/203 |
| 8,478,715 B2 | 7/2013 | Dorrell et al. | |
| 8,646,027 B2 | 2/2014 | Malaviarachchi et al. | |
| 8,731,983 B2 | 5/2014 | Gudla et al. | |
| 8,768,741 B1 | 7/2014 | Hinton et al. | |
| 8,966,569 B2 | 2/2015 | Schwartz et al. | |

(Continued)

FOREIGN PATENT DOCUMENTS

CA    2500573 A1    9/2006

OTHER PUBLICATIONS

NPL 51 Martey, R. M., Shaw, A., Stromer-Galley, J., Kenski, K., & Clegg, B. A. (2014). Testing the Power of Game Lessons: The Effects of Art and Narrative on Reducing Cognitive Biases. In Annual Conference of the Digital Games Research Association.

(Continued)

*Primary Examiner* — Eddy Saint-Vil
(74) *Attorney, Agent, or Firm* — McCarter & English, LLP

(57) ABSTRACT

A bias-sensitive crowd-sourced analytic system is disclosed that provides a collaborative, moderated, computer-mediated environment that includes integrated evaluation of analytical skill and cognitive de-biasing training; a simple, binary blue-team/red-team format that incorporates teaming and dedicated devil's advocacy; and accountability through quantitative scoring of reasoning, responses and associated confidence levels.

20 Claims, 19 Drawing Sheets

(56) References Cited

U.S. PATENT DOCUMENTS

| | | | | |
|---|---|---|---|---|
| 8,972,869 | B1* | 3/2015 | Willis | G06F 3/0482 715/753 |
| 2002/0152254 | A1 | 10/2002 | Teng | |
| 2005/0216381 | A1* | 9/2005 | Banatwala | G06Q 10/10 705/34 |
| 2007/0127793 | A1 | 6/2007 | Beckett et al. | |
| 2007/0220479 | A1 | 9/2007 | Hughes | |
| 2008/0235045 | A1 | 9/2008 | Suzuki et al. | |
| 2009/0087828 | A1* | 4/2009 | Hartman | G09B 7/02 434/362 |
| 2009/0205018 | A1 | 8/2009 | Ferraiolo et al. | |
| 2009/0222882 | A1 | 9/2009 | Kabat et al. | |
| 2010/0088125 | A1 | 4/2010 | Vaughan et al. | |
| 2010/0095373 | A1 | 4/2010 | Levenshteyn et al. | |
| 2013/0185096 | A1* | 7/2013 | Giusti | G06Q 50/24 705/3 |
| 2014/0006495 | A1* | 1/2014 | Adderly | H04L 12/1822 709/204 |
| 2014/0057240 | A1* | 2/2014 | Colby | G09B 7/02 434/350 |
| 2014/0106331 | A1* | 4/2014 | Mitalski | G09B 5/08 434/350 |
| 2015/0100503 | A1* | 4/2015 | Lobo | G06Q 10/103 705/301 |
| 2016/0036833 | A1* | 2/2016 | Ardeli | H04L 63/101 726/22 |
| 2016/0378960 | A1* | 12/2016 | DeWeese | H04W 12/08 726/7 |

OTHER PUBLICATIONS

NPL 52 McKernan, B., Martey, R.M., Stromer-Galley, J., Kenski, K., Clegg, B.A., Folkestad, J.E., Rhodes, M.G., Shaw, A., Saulinier, E.T., and Strzalkowski, T. (2015). We don't need no stinkin' badges: The impact of reward features and feeling rewarded in educational games Computers in Human Behavior vol. 45, p. 299-306.

NPL 53 Mellers, B., Stone, E., Atanasov, P., Rohrbaugh, N., Metz, S. E., Ungar, L., & Tetlock, P. (2015). The psychology of intelligence analysis: Drivers of prediction accuracy in world politics. Journal of experimental psychology: applied, 21(1), 1.

NPL 54 Mellers, B., Ungar, L., Baron, J., Ramos, J., Gurcay, B., Fincher, K., . . . & Murray, T. (2014). Psychological strategies for winning a geopolitical forecasting tournament. Psychological science, 25(5), 1106-1115.

NPL 55 Mellers, B.A., Tetlock, P.E., Baker, J.D., Friedman, J.A., Zeckhauser, R. (2015). How Much Precision is Necessary in Probabilistic Expressions of Risk? Accessed online Dec. 5, 2015 http://opim.wharton.upenn.edu/risk/conference/pprs/Mellers_How-Much-Precision-is-Necessary-in-Probabilistic-Expressions-of-Risk.pdf.

NPL 56 Melton, A.W. (1970). The situation with respect to the spacing of repetitions and memory. Journal of Verbal Learning and Memory, 9, 596-606.

NPL 57 Miller, G. A., The Magical Number Seven, Plus or Minus Two: Some Limits on Our Capacity for Processing Information, Psychological Review 63 (1956), 81-97.

NPL 58 Morewedge, C. K., Yoon, H., Scopelliti, I., Symborski, C. W., Korris, J. H., & Kassam, K. S. (2015). Debiasing Decisions Improved Decision Making With a Single Training Intervention. Policy Insights from the Behavioral and Brain Sciences, 2372732215600886. Accessed online Sep. 2, 2015 http://careymorewedge.com/papers/Morewedgeetal2015DebiasingwithTraining.pdf.

NPL 59 Musser, G. 2016.Metaknowledge, New York Times. Accessed online Jul. 8, 2016. https://aeon.co/essays/a-mathematical-bs-detector-can-boost-the-wisdom-of-crowds.

NPL 60 Nickerson, R.S. (1998). Confirmation Bias: A ubiquitous phenomenon in many guises. Review of General Psychology, 2(2), 175-220.

NPL 61 Northrop, L. (2014). Trends and New Directions in Software Architecture. Carnegie-Mellon University, Pittsburgh PA Software Engineering Inst.

NPL 62 Peterson, E., & Miller, S. F. (2012). The eyes test as a measure of individual differences: how much of the variance reflects verbal IQ. Frontiers in psychology, 3, 220.

NPL 63 Arcos, R and Pherson, R. H. (2015). Establishing a New Paradigm of Collaboration. In Intelligence Communication in the Digital Era: Transforming Security, Defence and Business (pp. 57-71). Palgrave Macmillan UK.

NPL 64 Pool, R. (Ed.). (2010). Field Evaluation in the Intelligence and Counterintelligence Context:: Workshop Summary. National Academies Press.

NPL 65 Prensky, M. (2001). Digital Natives, Digital Immigrants, On the Horizon, MCB University Press, vol. 9 No. 5. Accessed online Dec. 2001, http://www.marcprensky.com/writing/Prensky%20-%20Digital%20Natives,%20Digital%20Immigrants%20-%20Part1.pdf.

NPL 66 PriceWaterhouseCoopers Report (2015). Millennials at work: Reshaping the workplace. Accessed online Aug. 9, 2015 https://www.pwc.com/gx/en/managing-tomorrows-people/future-of-work/assets/reshaping-the-workplace.pdf.

NPL 67 Rieber, S. (2006). 'Communicating Uncertainty in Intelligence Analysis,' paper presented to the annual meeting of the International Studies Association, San Diego, Mar. 22. 2006. http://citation.allacademic.com/meta/p_mla_apa_research_citation/1/0/0/6/8/pages100689/p100689-1.php.

NPL 68 Roediger, H.L., & Karpicke, J.D. (2006). The power of testing memory: Basic research and implications for educational practice. Perspectives on Psychological Science, 1(3), 181-210.

NPL 69 Roelfsema, M.T., Hoekstra, R.A., Allison, C., Wheelwright, S., Brayne, C., Matthews, F.E. & Baron-Cohen, S. 2012). Are autism spectrum conditions more prevalent in an information-technology region? A school-based study of three regions in the Netherlands. Journal of Autism and Developmental Disorders, 42(5) pp. 734-739. Accessed online Apr. 6, 2015 http://oro.open.ac.uk/28986/5/Roelfsema_et_al_ASC_prevalence_NL_JADD_in_press.pdf.

NPL 70 Ross, L., Greene, D., & House, P. (1977). The "false consensus effect": An egocentric bias in social perception and attribution processes. Journal of Experimental Social Psychology, 13, 279-301.

NPL 71 Rubin, S., The Israeli Army Unit That Recruits Teens With Autism. The Atlantic. http://www.theatlantic.com/health/archive/2016/01/israeli-army-autism/422850/, Jan. 6, 2016.

NPL 72 Schmidt, R.A. & Bjork, R.A. (1992). New conceptualizations of practice: Common principles in three paradigms suggest new concepts for training. Psychological Science, 3, 207-217.

NPL 73 Schulz-Hardt, S., Jochims M., Frey, D. (2002). "Productive conflict in group decision making: Genuine and contrived dissent as strategies to counteract biased information seeking." Organizational Behavior and Human Decision Processes 88.2: 563-586.

NPL 74 Schweiger, D. M., Sandberg W.R., Ragan, J.W. (1986). "Group approaches for improving strategic decision making: A comparative analysis of dialectical inquiry, devil's advocacy, and consensus." Academy of management Journal 29.1: 51-71.

NPL 75 Slamecka, N.J. & Graf, P. (1978). The generation effect: Delineation of a phenomenon. Journal of Experimental Psychology: Human Learning and Memory, 4(6), 592-604.

NPL 76 Stromer-Galley, J., & Martinson, A. M. (2009). Coherence in political computer-mediated communication: analyzing topic relevance and drift in chat. Discourse & Communication, 3(2), 195-216.

NPL 77 Stromer-Galley, J., Bryant, L., & Bimber, B. (2015). Context and Medium Matter: Expressing Disagreements Online and Face-to-Face in Political Deliberations. Journal of Public Deliberation, 11(1).

NPL 78 Tecuci, G., Boicu, M., Marcu, D., Schum, D., & Hamilton, B. (2010).TIACRITIS System and Textbook: Learning Intelligence Analysis through Practice. Department of Defense Washington DC.

NPL 79 Tecuci, G., Marcu, D., Boicu, M., & Schum, D. (2015). COGENT: Cognitive Agent for Cogent Analysis. In the Proceedings of the 2015 AAAI Fall Symposium "Cognitive Assistance in

(56) References Cited

OTHER PUBLICATIONS

Government and Public Sector Applications", Arlington, VA, November. http://lac.gmu.edu/publications/2015/Cogent-overview.pdf.

NPL 80 Tecuci, G., Schum, D., Boicu, M., Marcu, D., Hamilton, B., & Wible, B. (2010). Teaching intelligence analysis with TIACRITIS. George Mason University, Fairfax, VA.

NPL 81 Tecuci, G., Schum, D., Marcu, D., & Boicu, M. (2013). Recognizing and Countering Biases in Intelligence Analysis with TIACRITIS. In STIDS (pp. 25-32). http://citeseerx.ist.psu.edu/viewdoc/download?doi=10.1.1.402.5053&rep=rep1&type=pdf.

NPL 82 Tetlock, P. E., Mellers, B. A., Rohrbaugh, N., & Chen, E. (2014). Forecasting Tournaments Tools for Increasing Transparency and Improving the Quality of Debate. Current Directions in Psychological Science, 23(4), 290-295.

NPL 83 Toossi, M. (2012). Labor force projections to 2020: a more slowly growing workforce, Bureau of Labor Statistics. http://www.bls.gov/opub/mlr/2012/01/art3full.pdf.

NPL 84 Tversky, A., & Kahneman, D. (1971). Belief in the law of small numbers. Psychological Bulletin, 76(2), 105-110.

NPL 85 Tversky, A., & Kahneman, D. (1974). Judgment under uncertainty: Heuristics and biases. Science, 185(4157), 1124-1131.

NPL 86 Tversky, A., & Kahneman, D. (1983). Extensional versus intuitive reasoning: The conjunction fallacy in probability judgment. Psychological Review, 90(4), 293-315.

NPL 87 Valacich, J. S., and Schwenk, C. (1995). Devil's Advocacy and Dialectical Inquiry Effects on Face-to-Face and Computer-Mediated Group Decision Making. Organizational Behavior and Human Decision Processes 63.2: 158-173.

NPL 88 van Gelder, T. (2007). Hypothesis testing—What's Wrong with ACH?, Dec. 31, 2007. http://timvangelder.com/2007/12/31/hypothesis-testing-whats-wrong-with-ach/.

NPL 89 Vul, E., & Pashler, H. (2008). Measuring the crowd within probabilistic representations within individuals. Psychological Science, 19(7), 645-647.

NPL 90 Wilson, T.D., Wheatley, T.P., Meyers, J.M., Gilbert, D.T., & Axsom, D. (2000). Focalism: A source of durability bias in affective forecasting. Journal of Personality and Social Psychology, 78, 821-836.

NPL 91 Woolley, A. (2015). Why some teams are smarter than others. The New York Times. http://www.nytimes.com/2015/01/18/opinion/sunday/why-some-teams-are-smarter-than-others.html?_r=0.

NPL 92 Woolley, A. W., Aggarwal, I., & Malone, T. W. (in press. Collective intelligence in teams and organizations. In T. W. Malone & M. S. Bernstein (Eds.), The handbook of collective intelligence. Cambridge, MA: MIT Press, 2015.

NPL 93 Woolley, A. W., Chabris, C. F., Pentland, A., Hashmi, N., & Malone, T. W. (2010) Evidence for a collective intelligence factor in the performance of human groups, Science, Oct. 29, 2010,330 (6004), 686-688; [DOI: 10.1126/science.1193147].

NPL 94 Woolley, A., & Malone, T. (2011). Defend your research: What makes a team smarter? More women, Harvard Business Review, Jun. 2011, 89 (6): 32-33.

NPL 95 Zeliadt, N., Artificial intelligence project could yield clues about autism, Spectrum News. https://spectrumnews.org/news/artificial-intelligence-project-could-yield-clues-about-autism/, Apr. 15, 2016.

NPL 1 Aggarwal, I., & Woolley, A.W. (2012).Two perspectives on intellectual capital and innovation in teams: Collective intelligence and cognitive diversity. In C. Mukhopadyay (Ed.), Driving the economy through innovation and entrepreneurship (pp. 495-502). Bangalore: Springer.

NPL 2 Allen, M., Glen, J.C., Mullensiefen, D.., Schwarzkopf, S.,, Callaghan, M.F., Rees, G. (2016). Metacognitive ability predicts hippocampal and prefrontal microstructure. Cold Spring Harbor Laboratory Pre-print server biorxiv, doi: http://dx.doi.org/10.1101/046359 Accessed online Mar. 30, 2016: http://biorxiv.org/content/early/2016/03/30/046359.

NPL 3 Atanasov, P., Rescober, P., Stone, E., Swift, S., Servan-Schreiber, E., Tetlock, P., Ungar, L., Mellers, B. (2016). Distilling the Wisdom of Crowds: Prediction Markets vs. Prediction Polls. Management Science. doi:10.1287/mnsc.2015.2374.

NPL 4 Bar-Hillel, M. (1980). The base-rate fallacy in probability judgments. Acta Psychologica, 44,211-233.

NPL 5 Barnes, A. (2016). Making intelligence analysis more intelligent: Using numeric probabilities. Intelligence and National Security, 31, No. 3, 327-344, Accessed online Mar. 1, 2016 http://dx.doi.org/10.1080/02684527.2014.994955.

NPL 6 Baron, J., Mellers, B. A., Tetlock, P. E., Stone, E., & Ungar, L. H. (2014). Two reasons to make aggregated probability forecasts more extreme. Decision Analysis, 11(2), 133-145.

NPL 7 Baron-Cohen S, Cassidy S, Auyeung B, Allison C, Achoukhi M, Robertson S, et al. (2014). Attenuation of Typical Sex Differences in 800 Adults with Autism vs. 3,900 Controls. PLoS ONE 9(7): e102251. doi:10.1371/journal.bone.0102251.

NPL 8 Baron-Cohen, S. (1990). Autism: a specific cognitive disorder of 'mind-blindness. International Review of Psychiatry 2: 81-90. doi:10.3109/09540269009028274.

NPL 9 Baron-Cohen, S. (2002). The extreme male-brain theory of autism, TRENDS in Cognitive Sciences vol. 6 No. Jun. 6, 2002.

NPL 10 Baron-Cohen, S., & Wheelwright, S. (2004). The Empathy Quotient (EQ): An investigation of adults with Asperger Syndrome and high-functioning autism, and normal sex differences. Journal of Autism and Developmental Disorders, 34, 163-175.

NPL 11 Baron-Cohen, S., Leslie, A. M., & Frith, U. (1985). Does the autistic child have a "theory of mind"? Cognition, 21(1), 37-46.

NPL 12 Baron-Cohen, S., Richler, J., Bisarya, D., Gurunathan, N., & Wheelwright, S. (2003). The systemizing quotient: An investigation of adults with Asperger Syndrome or high-functioning autism, and normal sex differences. In U. Frith & E. Hill (Eds.), Autism: Mind and brain (pp. 161-186). Oxford: Oxford University Press.

NPL 13 Bear, J. B., & Woolley, A. W. (2011). The role of gender in team collaboration and performance. Interdisciplinary Science Reviews, 36(2), 146-153.

NPL 14 Borrion, H., Gaballa, M., Wapshott, C., Johnson, S. D., & Harvey, N. (2013). An empirical study of the impact of reliability values on threat assessment. Prediction and Recognition of Piracy Efforts Using Collaborative Human-Centric Information Systems, 109, 89.

NPL 15 Brack, J. (2012). Maximizing millennials in the workplace. UNC Executive Development, 1-14. Accessed online Jul. 17, 2013 http://www.avds.com/images/blog/UNC_Millenials_Workplace_Study.pdf.

NPL 16 Bracy, C., Bevill, S., and Roach, T. D. (2010). The millennial generation: Recommendations for overcoming teaching challenges. In Allied Academies International Conference. Academy of Educational Leadership. Proceedings (vol. 15, No. 2, p. 21). Jordan Whitney Enterprises, Inc.

NPL 17 Cepeda, N., Vul, E., Rohrer, D., Wixted, J., & Pashler, H. (2008). Spacing effect in learning: A temporal ridgeline of optimal retention. Psychological Science, 19, 1095-1102.

NPL 18 Cepelewicz, J. (2016). The U.S. Government Launches a $100-Million "Apollo Project of the Brain." Scientific American, Accessed online Mar. 16, 2016 http://www.scientificamerican.com/article/the-u-s-government-launches-a-100-million-apollo-project-of-the-brain/.

NPL 19 Chang, W., and Tetlock, P.E. (2016). Rethinking the training of intelligence analysts, Intelligence and National Security, DOI:10.1080/02684527.2016.1147164 Accessed online on Feb. 29, 2016 http://www.tandfonline.com/doi/full/10.1080/02684527.2016.1147164.

NPL 20 Clegg, B.A, Malley, R.M., Stromer-Galley, J., Kenski, K., Saulnier, T., Folkestad, J.E., McLaren, E., Shaw, A., Lewis, J.E., Patterson, J.D., & Strzalkowski, T. (2014). Game-based training to mitigate three forms of cognitive bias. Proceedings of Interservice/Industry Training, Simulation and Education Conference (I/ITSEC), 14180, 1-12.

NPL 21 Copeland, R., Hope, B. (2016). Bridgewater, World's Largest Hedge Fund, Grapples With Succession. The Wall Street Journal, Mar. 16, 2016. Accessed at http://www.wsj.com/articles/bridgewater-worlds-largest-hedge-fund-grapples-with-succession-1458144347.

(56) References Cited

OTHER PUBLICATIONS

NPL 22 Dalkey, N. C. (1969). The Delphi Method: An Experimental Study of Group Opinion. United States Air Force Project RAND. http://www.rand.org/content/dam/rand/pubs/research_memoranda/2005/RM5888.pdf.

NPL 23 Dhami, M. K., Mandel, D. R., Mellers, B. A., & Tetlock, P. E. (2015). Improving intelligence analysis with decision science. Perspectives on Psychological Science, 10(6), 753-757.

NPL 24 Engel, D., Woolley, A. W., Aggarwal, I., Chabris, C. F., Takahashi, M., Nemoto, K., Kaiser, C., Kim, Y. J., & Malone, T. W. (2015) Collective intelligence in computer-mediated collaboration emerges in different contexts and cultures. Proceedings of the SIGCHI Conference on Human Factors in Computing Systems (CHI 2015), Seoul, Korea.

NPL 25 Engel, D., Woolley, A. W., Jing, L. X., Chabris, C. F., & Malone, T. W. (2014). Reading the mind in the eyes or reading between the lines? Theory of Mind predicts effective collaboration equally well online and face-to-face. PLOS One 9(12). doi: 10.1371/journal.pone.0115212.

NPL 26 Engel, D., Woolley, A. W., Jing, L. X., Chabris, C. F., & Malone, T. W. (2014). Reading the Minds in the Eyes or Reading between the Lines? Theory of mind predicts collective intelligence. Proceedings of Collective Intelligence 2014, Cambridge, MA, 16 pps.

NPL 27 Epley, N., & Gilovich, T. (2006). The anchoring-and-adjustment heuristic: Why the adjustments are insufficient. Psychological Science, 17, 311-318.

NPL 28 Fischhoff, B. (1982). Debiasing. In D. Kahneman, P. Slovic, & A. Tversky (Eds.), Judgment Under Uncertainty: Heuristics and Biases (pp. 422-444.). Cambridge: Cambridge University Press.

NPL 29 Friedman, J. A., & Zeckhauser, R. (2012). 'Assessing Uncertainty in Intelligence', Intelligence and National Security 27/4, pp. 824-847. Accessed online Apr. 17, 2015 file:///C:/Users/Regina/Downloads/RWP12-027_Zeckhauser.pdf.

NPL 30 Friedman, J. A., & Zeckhauser, R. (2014). Why Assessing Estimative Accuracy is Feasible and Desirable. Intelligence and National Security, 1-23.

NPL 31 Friedman, J.A., Baker, J.D., Mellers, B.A., Tetlock, P.E., and Zeckhauser, R. (2015). The Value of Precision in Probability Assessment: Evidence from a Large-Scale Geopolitical Forecasting Tournament.

NPL 32 Gigerenzer, G., & Brighton, H. (2009). Homo heuristicus: Why biased minds make better inferences. Topics in Cognitive Science, 1, 107-143.

NPL 33 Green, K. C., Armstrong, J. S., & Graefe, A. (2007). Methods to elicit forecasts from groups: Delphi and prediction markets compared.

NPL 34 Heuer Jr, R. J. (1981). Strategic deception and counterdeception: A cognitive process approach. International Studies Quarterly, 294-327.

NPL 35 Heuer Jr, R. J. (1999). Psychology of intelligence analysis. Lulu. com.

NPL 36 Heuer Jr, R. J. (2008). Taxonomy of Structured Analytic Techniques. In International Studies Association Annual Convention. Accessed online in Mar. 2015 http://www.pherson.org/wp-content/uploads/2013/06/03.-Taxonomy-of-Structured-Analytic-Techniques_FINAL.pdf.

NPL 37 Heuer Jr, R. J. (2009). The evolution of structured analytic techniques. Presentation to the National Academy of Science, National Research Council Committee on Behavioral and Social Science Research to Improve Intelligence Analysis for National Security, 529-545. Accessed online Sep. 27, 2014 https://www.e-education.psu.edu/drupal6/files/sgam/DNI_Heuer_Text.pdf.

NPL 38 Heuer Jr, R. J., & Pherson, R. H. (2015). A Tradecraft Primer: Structured analytic techniques for intelligence analysis (2nd Ed.).

NPL 39 Heuer Jr, R.J. (2008). Small Group Processes for Intelligence Analysis. Sherman Kent School Report, Accessed online on Apr. 2, 2015 http://www.pherson.org/wp-content/uploads/2013/06/02.-Small-Group-Processes.pdf.

NPL 40 Holmes, D.S. (1968). Dimensions of Projection. Psychological Bulletin, 69(4), 248-268.

NPL 41 Horowitz, M., Stewart, B., Tingley, D., Bishop, M., Resnick, L., Roberts, M., . . . & Tetlock, P.E. (2016). What Makes Foreign Policy Teams Tick: Explaining Variation in Group Performance at Geopolitical Forecasting.

NPL 42 Schumpeter, Team spirit: Businesses are embracing the idea of wokring in team. Managing them is hard, The Economist, http://www.economist.com/news/business-and-finance/21694962-managing-them-hard-businesses-are-embracing-idea-working-teams, 5 pgs, Mar. 19, 2016.

NPL 43 Iannotta, B. (2012). Stomping cognitive bias: How technology could help, Deep Dive Intelligence, Accessed Wine Apr. 5, 2015 http://www.deepdiveintel.com/2012/11/12/stomping-cognitive-bias/.

NPL 44 IARPA Sirius Research Program. Accessed online on Feb. 15, 2015 https://www.iarpa.gov/index.php/research-programs/sirius.

NPL 45 Joseph, R. (2015). Modernizing Analytical Training for the 21st Century, International Relations and Security Network—Swiss Federal Institute of Technology (ETH Zurich) Security Watch, Jun. 8, 2015.

NPL 46 Kahneman, D. (2003). A perspective on judgment and choice: Mapping bounded rationality. American Pychologist, 58, 697-720.

NPL 47 Kantor, D., Streitfeld, J. (2015) Inside Amazon: Wrestling Big Ideas in a Bruising Workplace. The New York Times, Aug. 15, 2015, Accessed at http://www.nytimes.com/2015/08/16/technology/inside-amazon-wrestling-big-ideas-in-a-bruising-workplace.html.

NPL 48 Katarzyna, C., Macari, S., Powell, K., DiNicola, K., Shic, F. (2016). Enhanced Social Attention in Female Infant Siblings at Risk for Autism Journal of the American Academy of Child & Adolescent Psychiatry, vol. 55, Issue 3, Mar. 2016, pp. 188-195.e1.

NPL 49 Kent, S. (1949). Strategic intelligence for American world policy. Princeton University Press.

NPL 50 Kent, S. (1964). Words of estimative probability. Studies in Intelligence, 8(4), 49-65. Accessed online Apr. 17, 2015 https://www.cia.gov/library/center-for-the-study-of-intelligence/csi-publications/books-and-monographs/sherman-kent-and-the-board-of-national-estimates-collected-essays/6words.html.

\* cited by examiner

SYSTEMS AND METHODS FOR BIAS-SENSITIVE CROWD-SOURCED ANALYTICS

CROSS REFERENCE TO RELATED APPLICATIONS

This application claims the benefit of priority to U.S. Provisional Application No. 62/325,462 filed on Apr. 21, 2016, the content of which is hereby incorporated by reference in its entirety.

FIELD OF TECHNOLOGY

Exemplary embodiments of the present disclosure relate generally to systems and methods for bias-sensitive crowd-sourced analytics in a collaborative, moderated, computer-mediated environment.

BACKGROUND

The volume, velocity and variety of information available are increasing exponentially, as is the difficulty in assessing its veracity due to the ease of using the Internet as a disinformation vehicle. This requires greater efficiency in the ability to analyze information, including the potential for automated assistance to help human users work through a structured analytical process.

Currently there are a number of solutions for a collaborative analytic technique. They generally fall into two camps: manual and automated. Manual structured analytical techniques—conveyed via written primers or orally through teaching and exposition—typically consist of approaches to collect relevant information, to establish hypotheses and determine causality and to synthesize the data and analysis into a coherent analytical product that aids decision making. But manual techniques are cumbersome and slow. Automated and automation-assisted techniques circumvent the unwieldiness of manual systems and offer the advantage of electronic instantiation of varied analytic approaches as built-in user experience components. But automated analytic techniques are typically cumbersome as well, requiring analytical steps that are not always pertinent to each specific problem. As a result, some systems experience user attrition because electronic instantiations do not effectively manage the trade-off between incorporating a wide array of analytic approaches in the technique and creating a more streamlined user experience.

Furthermore, in both automated and manual structured analytic techniques, the problem of cognitive bias still looms as a constant and undesirable factor. To date, the mitigation of cognitive bias in analytic techniques has only been addressed as an indirect by-product of using the analytical approaches themselves. Developers of analytic techniques have generally taken the position that it is impossible to diminish cognitive biases because of their complexity and universality, and that merely using a collaborative structured analytical technique was the best way to mitigate the critical problem of cognitive bias in analysis. However, no evidence supports this assertion (Pool, R. (Ed.). (2010). Field Evaluation in the Intelligence and Counterintelligence Context: Workshop Summary. National Academies Press). To the contrary, recent studies have shown that integrating a dedicated cognitive de-biasing training environment into a workflow process can improve prediction accuracy by a statistically significant margin.

In addition to the failure of analytic techniques to mitigate cognitive biases, assessments in conventional analytical techniques are generally registered using imprecise and high-level verbiage rather than quantified scoring. For example, under conventional analytic techniques, users are often asked to rate likelihood or consistency/inconsistency using labels (e.g. low, medium, high, very likely, very unlikely, etc.). Among the reasons given for this are that mathematical precision would be less practical for broad use and not easily understood and that it would be too easy to misuse any simple probability calculation. But recent research on quantitative equivalency of semantic expressions of certainty show analysts can consistently justify a more fine-grained level of precision than words of estimative probability currently allow. (Mellers, B., Ungar, L., Baron, J., Ramos, J., Gurcay, B., Fincher, K., . . . & Murray, T. (2014). Psychological strategies for winning a geopolitical forecasting tournament. Psychological science, 25(5), 1106-1115; Friedman, J. A., & Zeckhauser, R. (2014). Why Assessing Estimative Accuracy is Feasible and Desirable. Intelligence and National Security, 1-23; Friedman, J. A., Baker, J. D., Mellers, B. A., Tetlock, P. E., and Zeckhauser, R. (2015). The Value of Precision in Geopolitical Forecasting: Empirical Foundations for Intelligence Analysis and Foreign Policy Decision Making). It is now generally understood that the elicitation of quantified probabilistic assessments within a large crowd of analysts is not only possible, it is also desirable if performance accountability is to be measured effectively (Barnes, A. (2016). Making intelligence analysis more intelligent: Using numeric probabilities. Intelligence and National Security, 31, No. 3, 327-344; Mellers, B., Ungar, L., Baron, J., Ramos, J., Gurcay, B., Fincher, K., . . . & Murray, T. (2014). Psychological strategies for winning a geopolitical forecasting tournament. Psychological science, 25(5), 1106-1115; Mellers, B., Stone, E., Atanasov, P., Rohrbaugh, N., Metz, S. E., Ungar, L., & Tetlock, P. (2015). The psychology of intelligence analysis: Drivers of prediction accuracy in world politics. Journal of experimental psychology: applied, 21(1), 1; Tetlock, P. E., Mellers, B. A., Rohrbaugh, N., & Chen, E. (2014). Forecasting Tournaments Tools for Increasing Transparency and Improving the Quality of Debate. Current Directions in Psychological Science, 23(4), 290-295). Current analytical techniques that depend upon the use of semantic expressions of likelihood (like "highly likely" or "unlikely") sacrifice accuracy due to ambiguity in what such semantic expressions actually mean (Friedman, J. A., & Zeckhauser, R. (2012). Assessing Uncertainty in Intelligence', Intelligence and National Security 27, 4, p. 824-47; Friedman, J. A., & Zeckhauser, R. (2014). Why Assessing Estimative Accuracy is Feasible and Desirable. Intelligence and National Security, 1-23; Friedman, J. A., Baker, J. D., Mellers, B. A., Tetlock, P. E., and Zeckhauser, R. (2015). The Value of Precision in Geopolitical Forecasting: Empirical Foundations for Intelligence Analysis and Foreign Policy Decision Making).

Many conventional structured analytic techniques task users with the dual role of both data imputation (i.e. generating a hypothesis on the basis of data) as well as refutation, despite recent reports that evaluation of hypotheses through dedicated red-teaming can provide a successful method by which analysts can identify weaknesses and challenge assumptions. While crowd-based red-teaming is typically not a feature of conventional structured analytic techniques, studies indicate that red-teaming is best done by a dedicated entity that only conducts falsification, as a way of avoiding confirmation biases that tend to become evident when analysts provide both affirmative reasoning and alternative hypotheses. (Zenko, M. (2015), Red Team: How to Succeed By Thinking Like the Enemy. Council on Foreign Relations, Basic Books, New York).

Finally, collaborative techniques remain slow, inefficient, and difficult to use due to overly complex structures. In computerized processes, one problem stems from leaving a user to choose from a set of differing techniques. A separate issue is that the platform development and distribution model remains tied to desktop-based software. To date, collaborative analytics generally have not provided data structures that enable resource-efficient data handling and options for collaborative analysis while maintaining data consistency across users.

SUMMARY OF THE INVENTION

Exemplary embodiments of the present disclosure advantageously overcome the deficiencies of conventional structured analytic techniques by providing systems and methods for a bias-sensitive crowd-sourced analytic technique in a collaborative environment that includes integrated evaluation of analytical skill; cognitive de-biasing training; a simple, binary blue-team/red-team format that incorporates small, crowd-sourced teams and dedicated devil's advocacy; and accountability through quantitative scoring of reasoning, responses and associated confidence levels.

Exemplary embodiments of the present disclosure provide for a structured analytical technique for collaborative analysis that integrates an explicit bias-reducing component to train users in recognizing and avoiding common errors in analytical thinking; to assist in determining user roles within the workflow on the basis of training results; and to reinforce the user's ability to recognize and avoid said errors over time through performance feedback. The structured analytic technique for collaborative analysis can identify optimal analytical abilities in users through cognitive tests to facilitate dynamic assignment of user roles in the structured analytic technique. To evaluate analytical skill, the combination of tests can include, but are not limited to, an Empathy Quotient (EQ) test; a Systemizing Quotient (SQ) test; a verbal intelligence quotient (IQ) test; and a confidence-calibration test. Embodiments of the structured analytic technique for collaborative analysis can provide an easy to use and portable environment using responsive design principles to ensure native appearance across various devices (e.g., over both desktop and mobile devices).

A simple binary structure that follows a blue-team/red-team guided format is intuitive for users, harnesses the "wisdom of the crowd" more effectively through collaboration organized into two distinct crowds/teams with specific functions and makes long-term use and retention possible. The use of a dedicated and separate devil's advocate red-team crowd better harnesses the advantages of collaborative analysis by distributing the cognitive burden of hypotheses generation, falsification and elimination more evenly, easily and efficiently across all participants.

Exemplary embodiments of the collaborative analytic technique can elicit quantified probabilistic confidence estimates, and quantified performance ratings, resulting in a structured analytic technique that processes information more precisely than state-of-the-art approaches and allows for more precise understanding of the results.

As described herein, exemplary embodiments of the present disclosure provide for a bias-sensitive collaborative structured analytical technique with a simple, intuitive binary structure that distributes cognitive effort across workflow processes and computing resources more evenly in a collaborative, blue-teamed/red-teamed environment that contains dedicated devil's advocacy; measures analytical accountability and performance outcomes with quantified metrics; which evaluates and trains users on the cognitive principles that contribute to effective analysis; and whose software instantiation is produced with cloud-based instantiation and responsive design principles to facilitate speed, ease of use, data consistency, and efficient resource allocation to facilitate crowd-sourced analytics.

In accordance with embodiments of the present disclosure methods and systems are described herein that can include the following steps and components. A "Start Workflow"/Registration component that allows a user to view or determine the problem being analyzed, receive performance scores and details on analytical workflow cases that are underway or concluded and retrieve information on their role within the workflow process (an individual or primary user also known as "Decision-Maker," is the recipient of information from the two "crowds" operating as the Impute blue-team and the Refute red-team, and is responsible for entering a final response at the conclusion of the workflow process after evaluating the "wisdom" provided by the "crowds"; other users within the workflow process serve as a member of either the Impute Crowd or the Refute Crowd and within each crowd, one member is assigned the role of Moderator by the Moderator Propensity Score to facilitate collaborative discussion among the team members during group deliberation). In the first instance, users provide basic details such as name, age, gender, and subject matter expertise, along with other personal details in the Start Workflow/Registration component and systems and methods can dynamically assign user roles within the workflow process based on the inputs received from a user in the Start Workflow/Registration component. A workflow process runtime clock is customizable in the Start Workflow/Registration component. The information/data input in the Start Workflow/Registration component are recorded by an Administrator function within the Start Workflow/Registration component.

A one-time Cognitive Testing component is presented to users in their first use of exemplary embodiments of the present disclosure and after initial registration. The Cognitive Testing component can facilitate evaluation of users' analytical ability through tests measuring a user's Empathy Quotient, Systemizing Quotient, verbal IQ and confidence calibration. The results of these tests can be used to generate a factored score that can contribute to a Moderator Propensity Score, which can be used by system and methods to dynamically determine and assign Moderator roles users in either an Impute multi-member analytical blue-team/"crowd" or a Refute multi-member analytical red-team/"crowd".

De-Biasing Training is a metacognitive training component that is designed to reduce judgment errors and flawed thinking through a series of modules (e.g., ten modules). Each de-biasing module can be dedicated to explaining, demonstrating and quizzing users on an example of common systematic errors in reasoning—including but not limited to—cognitive biases. Upon completion of the de-biasing module, the system generates the user's Metacognition Score based on how well users answered the questions in the De-Biasing Training modules. Since registered users undergo the Cognitive Testing once during a first use of the bias-sensitive collaborative analytic environment, subsequent use of the environment by a user moves the user from Start Workflow/Registration straight to De-Biasing Training on every use thereafter. During the first use of this bias-sensitive collaborative analytic environment, a user cannot proceed to the next component in the bias-sensitive collaborative analytic environment without completing each of the de-biasing modules. Upon subsequent uses of bias-sensitive analytic environment, users are not required to complete the modules in De-Biasing Training again, but are instead given the option to selectively review modules pertinent to the workflow process. De-Biasing Training builds upon the evaluation of analytical propensity in Cognitive Testing by teaching users how to avoid logic flaws and judgment errors in an effort to improve their analytical abilities—a critical necessity for analysis, especially if a user does not show a natural analytical propensity. De-Biasing Training Metacognition Scores are factored with said Cognitive Testing scores to produce the Moderator Propensity Score, which is used to assign the Moderator roles within crowd deliberation in both Impute and Refute phases. In the Impute phase, individuals can be asked to provide their analysis and hypothesis regarding the correct answer. In the Refute phase, other individuals can be tasked with providing opposing evidence and arguments to the hypotheses advanced in the Impute phase.

A Question Classification component is available to follow the De-Biasing Training, and can permit Decision-Makers to establish the type of process required by the problem being analyzed. For example, the Question Classification component can guide the Decision-Makers through a series of questions about the nature of input and output required by the problem, and can classify the question according to its subject matter. Since users can provide information regarding their subject matter expertise areas in the Start Workflow/Registration component at the start of the workflow process, the Question Classification component permits matching the problem to the users who will become members of the two "crowds" in the workflow process. Matches in subject matter between the analytical problem and crowd-team users contribute as factors in the Moderator Propensity Score, and lead to the dynamic designation of two team Moderators at this point in the workflow process— one for the Impute team/"crowd" and one for the Refute team/"crowd."

After users are dynamically assigned to their respective teams/crowds and a Moderator has been assigned to each team/crowd, an Impute phase can begin. In Impute phase, the Decision-Maker can begin in an Impute A sub-section which is known as Verification. In the Verification sub-section, the Decision-Maker can be presented with a series of questions regarding the problem that ends with the Decision-Maker drafting an initial hypothesis and an initial contrarian (or countervailing) hypothesis to answer the analytical problem, accompanied with concise reasoning for each of the two hypotheses, possible biases, and confidence ratings expressed as probability estimates that the Decision-Maker's stated hypotheses and reasoning are correct. The Verification sub-section can include sub-sections (e.g., seven sub-sections) that the Decision-Maker can follow to establish evidence supporting the reasoning and hypotheses including, for example: a Veracity sub-section for assessing whether the information source is identified and credible; a What sub-section for identifying key assumptions that can be made about the analytical problem and which assumptions can be made from fact, versus judgment, versus description, and versus generalization; a Who sub-section for identifying the key actors; a Where sub-section for considering whether location is relevant to solving the problem; a When sub-section for considering whether time is relevant to solving the problem; a Why sub-section for identifying objectives, motivations, authority, legitimacy, competency and interests of key actors identified in Who sub-section; and a Miscellaneous sub-section for considering whether all the information needed to solve the problem is available. Separately and simultaneously, the individuals that make up Impute A Crowd also undergo the same Verification process as the Decision-Maker with each member of Impute A Crowd individually recording their own hypothesis and contrarian hypotheses, along with accompanying reasoning, possible biases and confidence ratings. These results are returned to Decision-Maker so that they can be used in drafting Decision-Maker's first recorded estimate. Subsequently, Impute A Crowd members assess their analytics as a group. A limited time period can be provided for the Impute A Crowd members to discuss each other's responses and update their own analysis. After the time period elapses, the Impute Crowd Moderator (selected using the Moderator Propensity Score) records the final hypothesis and each individual crowd member individually registers their confidence ratings regarding the group hypothesis separately. Subsequently, Impute A Crowd responses (the group's and individuals' scores) are returned to the Decision-Maker so that the Decision-Maker may choose to revise their own analysis after reviewing Impute A Crowd estimates. Decision-Makers can augment their analysis by conducting information searches using a list of curated high quality information sources, as well as any number of mechanisms, including search engines, etc. Information gleaned from the Question Classification component aids in information gathering at this stage.

If the Decision-Makers are required to analyze problems with less knowable outcomes, they are directed through Impute B, where they work directly with the Impute Crowd, as opposed to separately as in Impute A. They first gather information as a team in Base Rate and then process information-gathering through a taxonomy of Political, Economic, Security, and Socio-Cultural forces, as appropriate. During Impute B, the Impute Crowd generates a curated wiki template that guides participants led by Impute Crowd Moderator through discussion to determine their best response as a group, along with reasoning, possible biases and confidence ratings before recording the final response that concludes Impute B workflow process. If scenarios are required to conclude the workflow process, Impute B generates drivers, matrix and scenario canvas templates so that participants as an integrated crowd led by Impute Crowd Moderator can generate scenarios with associated confidence ratings that serve as a final response to Impute stage if scenarios or similar narrative and graphic responses are required.

The generated results of both Impute A and Impute B are sent onwards to Refute phase, in which a different dedicated crowd acts as a red-team devil's advocate on the results generated from the Impute sections. The Refute team assesses the quality of thinking and analysis done by both Decision-Makers and Crowds in Impute by establishing: 1. Information Gaps & Vulnerable Assumptions; 2. Unobserved Norms And Protocols That Will Affect The Answer; 3. Wishful Thinking In Analysis; and 4. Biases And Poor Metacognitive Practice. The Refute team records its own hypothesis and confidence percentages, both at the individual and group levels, which is sent to Decision-Maker prior to recording of the final response and the conclusion of the workflow process. If the Refute team's hypothesis and confidence ratings are within a threshold of agreement with the Impute analysis, the Decision-Makers are prompted to record a final answer to the problem, with final confidence ratings. If the Refute team's hypothesis and confidence scoring is outside a threshold of agreement with the Impute analysis, the Decision-Makers are prevented from recording a final response and are directed to start the Impute process one more time to review information and thinking and revise their scores if required. Before the Decision Makers are sent back into Impute phase, the Decision-Makers can be prompted to select and review De-Biasing Training individual modules if they wish. Their Metacognition Scores will be updated if they choose to review any modules. Once they pass through De-Biasing Training, the Decision-Makers make a second and final pass through the Impute phase, this time without the Impute Crowd, before recording a final answer. The second pass does not go through Refute a second time.

The crowd-sourced and binary blue-team/red-team structure of Impute/Refute analysis is designed to draw users through an iterative analytical process in which crowd-aided knowledge assists in the formation of causal and predictive assessments through both information augmentation (Impute) and falsification (Refute) processes. Quantified outcome accountability constitutes a central component of the present invention because outcome scoring plays a key role in driving long-term analytical performance. At all key decision-making points, both Decision-Makers and crowd-members are required to deliver not only their responses, but also estimates of their confidence in each response, using the probability scale on a scale, with a range of 0 to 100%. In the Refute phase, red-team crowd-members are asked for answers to the given problem as well as confidence ratings. The outcome accountability setup allows us to measure the marginal improvement of estimates, or lack thereof, as the Decision-Makers gain access to the work of other team members.

All users can receive scoring feedback comprised of a combination of three measures: accuracy; impact; and rigor (collectively referred to by the acronym AIR). First, accuracy measures (AIR 1) are based on the frequency of reporting correct answers and the confidence ratings reported for correct versus incorrect answers. Accuracy measures are based on the Brier score (Brier, G. W. (1950). Verification of forecasts expressed in terms of probability. Monthly weather review, 78(1), 1-3.), a proper scoring rule, adapted to accommodate problems without pre-specified answer options (i.e. open-ended problems). Second, Impute and Refute teams receive feedback on the impact of their analyses upon the accuracy of the Decision-Makers (AIR 2). Because the Decision-Makers are asked to provide hypotheses and confidence ratings independently at first, then update them after having reviewed input from Impute and Refute teams, the exemplary embodiments can assess incremental accuracy improvements before versus after reviewing the work of each team. This allows the system to measure impact, which is based on the change in Decision-Maker accuracy. Third, the Decision-Makers can assess the rigor of the hypotheses and rationales produced by independent (pre-deliberation) users from Impute and Refute teams (one rating per individual), as well as the team-based hypotheses and rationales (one rating per team) (AIR 3). The Decision-Maker rigor ratings are expressed on a 5-point scale, based on the following criteria: 1. Prior Experience/Expertise, 2. Insight, 3. Independence, 4. Cogency of Reasoning, and 5. Persuasiveness. The responder can choose to respond to the five items separately, provide a single holistic evaluation, or both. All scores are made available after participants have completed their work and the analytical problems are closed. The first and second measures (AIR 1 and AIR 2) are available for problems with knowable correct answers, after the answers become known. Only the third measure (rigor) is used for open-ended problems with unknowable answers. For such problems, a user can be asked to define up to four answer options. The system administrator validates the answer options and can request edits from participants.

In accordance with embodiments of the present disclosure, the Start Workflow/Registration component, Cognitive Testing component, De-Biasing Training component, and Question Classification component can each include a Management System. The Management System of the Start Workflow/Registration component can support user registration and management processes. The Management System can provide the components for registering new users and capturing and storing user profile information. The Management System of the Cognitive Testing component can be responsible for supporting the Cognitive Testing processes. The Management System of the De-Biasing Training component can be responsible for providing client-side user interface components, data management, Application Program Interface (API) services and overall workflow management of the De-Biasing Training. The Management System of the Question Classification component can be responsible for supporting the client-side user interface components and question classification component. A set of API services can manage the content (i.e., questions, subject matter categories, keywords, etc.) provided to the user to assist in classifying the type of question inject. A Decision Management System can be provided, which can be responsible for user experience of the users that are assigned the Decision-Maker roles. In exemplary embodiments, the bias-sensitive collaborative analytic environment can provide client facing interface components, manage data sources, and provide data from the Impute and Refute processes. An Impute Management System can be responsible for the overall management and user experience of the Impute phase/process. Embodiments of the bias-sensitive collaborative analytic environment can provide client facing interface components, manage data sources, provide publicly accessible APIs and drive the overall workflow needed during the Impute phase/process. A Refute Management System can be responsible for the overall management and user experience of the Refute phase/process. Embodiments of the bias-sensitive collaborative analytic environment can provide the client facing interface components, manage all data sources, provide publicly accessible APIs, and drive the overall workflow needed during the Refute phase/process. An Administration System can be responsible for providing administrators to perform various tasks throughout electronic instantiations of this bias-sensitive collaborative environment. The administrator can perform tasks related to opening, closing and scoring of questions; send messages to participants; view rationales, hypotheses and confidence ratings across teams and users; and perform other general administrative tasks across the system. Embodiments of the present disclosure can also be integrated within machine learning APIs as part of the workflow process.

Exemplary embodiments of the present disclosure are unique when compared to other known processes and solutions, for example, at least because embodiments of the present disclosure provide a bias-sensitive crowd-sourced analytic environment with a feature-rich Cognitive Testing component and an integrated and dedicated cognitive De-Biasing Training environment as components of a total structured analytical workflow process. This distinct advantage over existing formats is due to the functional emphasis on explicitly mitigating cognitive bias, as opposed to an indirect outcome. The Cognitive Testing component is designed to assess which participants have greater analytical ability—which informs the assignment of participants to teams, as well as the weights placed on their judgments relative to other participants. The De-Biasing Training environment further hones users' abilities to recognize and avoid common systematic errors of judgment. By "gamifying" or structuring the De-Biasing Training as a game in which users can earn points that make up a Metacognition Score and see how they competitively stack up against other users on a leaderboard, exemplary embodiments of the present disclosure not only yield improvements in bias recognition among analysts, but it may also reduce attrition in this relatively fun and interactive environment.

Quantified outcome accountability constitutes a central and unique component of embodiments of the present disclosure that improves upon collaborative structured analytical techniques that use semantic wording to assess analyses, which leads to a loss in analytic precision. Outcome scoring plays a key role in driving long-term analytical performance. At key decision-making points, both Decision-Makers and crowd-members can be required to deliver not only quantified estimates on the precision of their answers, but also a probability-based assessment of their confidence in responses. In addition to providing answers to a given problem, individual Decision-Makers and crowd-members in both Impute A and Impute B provide a confidence rating on a scale of 0 to 100%. In Refute, red-team crowd-members are asked for answers to the given problem as well as confidence ratings. The outcome accountability setup allows embodiments of the present disclosure to measure the marginal improvement of estimates, or lack thereof, as Decision-Makers gain access to the estimates of team members and adversarial parties. Users of embodiments of the present disclosure receive scoring feedback comprised of a combination of three measures: accuracy, impact and rigor (AIR), as described herein.

Exemplary embodiments of the present disclosure are unique in that they are structurally different from other known collaborative structured analytical techniques. For example, exemplary embodiments of the present disclosure integrate cognitive testing and cognitive de-biasing training as core components in the workflow process to reduce flaws and judgment errors in the analytical process. As another example, exemplary embodiments of the present disclosure eschew vague verbal estimates of the probability of outcomes, and integrate quantified outcome accountability, which can improve analytical accuracy in the long run (Atanasov, P., Chang, W., Patil, S., Mellers, B., Tetlock, P. (2017) Accountability and adaptive performance: The long-term view. Working Paper.).

At key decision-making points, participants in the analytical workflow process can be required to deliver, not only an estimate on the precision of their answers, but also a probability-based assessment of their confidence in each response. Users can receive quantified scoring feedback comprised of a combination of three measures: accuracy, impact and rigor (AIR) as described herein.

Exemplary embodiments provide a simpler-to-use environment as a result of a binary analytical workflow structure that uses a blue-team/red-team model as its basis. Embodiments of the present disclosure have a structure that permits separate and dedicated crowd-sourced red-teams to provide fresh perspective to an individual analyst—or Decision-Maker—charged with imputation and basic refutation duties, acting as a further check on the check that a crowd-sourced imputation/blue-team provides to an individual analyst or Decision-Maker. Furthermore, the simple binary blue-team/red-team structure prevents users of an analytical technique getting bogged down by having to choose from different analytical methods to deploy. Further still, the crowd-aided blue-team/red-team structure requires fewer hypotheses to be generated by any one analyst—in the present invention's case, analysts are required to only generate two hypotheses at most—which distributes cognitive burden across the workflow process and reduces the potential for compounded analytical error that comes from any single analyst having to make several hypotheses and then reject them by process of elimination. This simpler, binary crowd-aided blue-team/red-team structure is central to the facilitation of greater accuracy, accountability and ease of use in the structured analytical technique.

In accordance with embodiments of the present disclosure, a computer implemented method for dynamically displaying textual information within windows of one or more graphical user interfaces of a multi-user distributed environment is disclosed. The method includes initiating a workflow process associated with a structured analytic technique by one or more servers and rendering, selectively, a sequence of timed windows on user devices in communication with the one or more servers based on the collaborative data space and according to a continuous clock functionality being executed by the one or more servers in response to execution of workflow process. The one or more servers can create a collaborative data space in response to the workflow process being initiated. The sequence of timed windows rendered on the user devices includes automatically relocating text information between the timed windows upon expiration of specified time intervals. The timed windows are rendered on different groups of the user devices based on the continuous clock function.

In accordance with embodiments of the present disclosure, a system for dynamically displaying textual information within windows of one or more graphical user interfaces of a multi-user distributed environment is disclosed. The system can include one or more servers and one or more data storage devices storing databases that include data, such as analytical problems to be analyzed as well as gathered evidence (e.g., information/data) that may be relevant to the analytical problem. The one or more servers can retrieve the data from the database and create a collaborative data space in the memory of the servers. The collaborative data can be selectively accessible by groups of user devices. The one or more servers can be configured to initiate a workflow process associated with a structured analytic technique by one or more servers. The collaborative data space can be created in response to the workflow process being initiated. The one or more servers can also be configured to selectively render a sequence of timed windows on user devices in communication with the one or more servers based on the collaborative data space and according to a continuous clock functionality being executed by the one or more servers in response to execution of workflow process. The sequence of timed windows is rendered on the user devices includes automatically relocating text information between the timed windows upon expiration of specified time intervals. The timed windows are rendered on different groups of the user devices based on the continuous clock function.

In accordance with embodiments of the present disclosure, a computer-implemented method for dynamically displaying textual information within windows displayed in one or more graphical user interfaces is disclosed. The method includes initiating a workflow process; rendering a first window containing textual information in a first format on a display of one or more user devices. The textual information guides one or more users of the one or more user devices through a review of evidence. The method also includes rendering a second window on the one or more user devices that reveals the status of evidence being analyzed and probabilistic estimates of evidence being analyzed and rendering a third window on the one or more user devices that provides a computer-mediated communication interface through which one or more users debate the evidence in a contemporaneous forum, and within a first timed interval, provide probability estimates on hypothesized outcomes. The first timed interval is implemented by a continuous clock functionality that monitors the timing of the first, second, and third windows. The method further includes relocating the textual information of the first, second and third windows, by one or more servers to a fourth window for review by an end user—the Decision-Maker as defined herein—and through which the end user can enter a separate estimate. The text information is automatically relocated to the fourth window by the one or more servers upon expiration of the first timed interval. The method can also include relocating the text information to a fifth window when a new group of one or more users are permitted to review the textual information. The new group of one or more users is permitted to review the textual information upon expiration of a second timed interval, whereupon the new group of one or more users can generate group estimates. The method can also include returning the relocated textual information, by the one or more servers, back to the fourth window from the fifth window to prompt the end user, i.e. the Decision-Maker, for a final estimate.

In accordance with embodiments of the present disclosure, a system for dynamically displaying textual information within windows displayed in one or more graphical user interfaces is disclosed. The system can include one or more servers and one or more data storage devices storing databases that include data, such as analytical problems to be analyzed as well as gathered evidence (e.g., information/data) that may be relevant to the analytical problem. The one or more servers can be configured to initiate a workflow process; render a first window containing textual information in a first format on a display of one or more user devices. The textual information can guide one or more users of the one or more user devices through a review of evidence. The one or more servers can also be configured to render a second window on the one or more user devices that reveals the status of evidence being analyzed and probabilistic estimates of evidence being analyzed and to render a third window on the one or more user devices that provides a computer-mediated communication interface through which one or more users debate the evidence in a contemporaneous forum, and within a first timed interval, provide probability estimates on hypothesized outcomes. The first timed interval is implemented by a continuous clock functionality that monitors the timing of the first, second, and third windows. The one or more servers can further be configured to relocate the textual information of the first, second and third windows, by one or more servers to a fourth window for review by an end user—the Decision-Maker as defined herein—and through which the end user can enter a separate estimate. The text information is automatically relocated to the fourth window by the one or more servers upon expiration of the first timed interval. The one or more servers can be configured to relocate the text information to a fifth window when a new group of one or more users are permitted to review the textual information. The new group of one or more users is permitted to review the textual information by the one or more servers upon expiration of a second timed interval, whereupon the new group of one or more users can generate group estimates. The one or more servers can be configured to return the relocated textual information back to the fifth window from the fourth window to prompt the end user, i.e. the Decision-Maker, for a final estimate.

In accordance with embodiments of the present disclosure, a method of controlling access provisions in a multi-user, collaborative computer environment is disclosed. The method includes establishing, by one or more servers, a collaborative data space that is simultaneously accessible by users over a communication network; dynamically grouping at least a subset of the users into groups; controlling access provisions to content in the collaborative data space in a first access phase to grant a first group of the users access to the content and to deny a second group of the users access to the content; receiving input in the collaborative data space from the first group of the users to collaboratively modify the content of the data space in the first access phase; preventing access to the content of the collaborative data space by the second group of the users in the first access phase; and dynamically modifying the access provisions to the content in the collaborative data space in a second access phase to deny the first group of the users access to the content and to grant a second group of the users access to the content in response to a configurable amount of time that has elapsed since the first group of users was provided access to the content of the collaborative data space or in response to an action of the at least one of the users in the first group and after collaborative modification to the content of the collaborate data space is committed to a database.

In accordance with embodiments of the present disclosure, a system of controlling access provisions in a multi-user, collaborative computer environment is disclosed. The system can include one or more servers and one or more data storage devices storing databases that include data, such as analytical problems to be analyzed as well as gathered evidence (e.g., information/data) that may be relevant to the analytical problem. The one or more servers can be configured to establish a collaborative data space that is simultaneously accessible by users over a communication network; dynamically group at least a subset of the users into groups; control access provisions to content in the collaborative data space in a first access phase to grant a first group of the users access to the content and to deny a second group of the users access to the content; receive input in the collaborative data space from the first group of the users to collaboratively modify the content of the data space in the first access phase; prevent access to the content of the collaborative data space by the second group of the users in the first access phase; and dynamically modify the access provisions to the content in the collaborative data space in a second access phase to deny the first group of the users access to the content and to grant a second group of the users access to the content in response to a configurable amount of time that has elapsed since the first group of users was provided access to the content of the collaborative data space or in response to an action of the at least one of the users in the first group and after collaborative modification to the content of the collaborate data space is committed to a database.

In accordance with embodiments of the present disclosure, a method implemented by a bias-sensitive, collaborative, computer-mediated communication system is disclosed. The method includes selectively permitting a user access to one or more databases storing evidence associated with an analytical problem to be analyzed; presenting the evidence retrieved from the one or more databases to the user within a specified time period based on permitted access to the one or more databases; receiving an outcome estimate from the user within the time period; and eliminating access to the evidence retrieved from the one or more databases in response expiration of the time period or in response to receiving the outcome estimate. The window available during this time period involves a component that trains the user to recognize and mitigate adverse cognitive biases and measures of cognitive ability and expertise of the user to generate a plurality of types of user performance scores based on activities of the user within the time period.

In accordance with embodiments of the present disclosure, a bias-sensitive, collaborative, computer-mediated communication system is disclosed. The system includes one or more servers and one or more data storage devices storing databases that include data, such as analytical problems to be analyzed as well as gathered evidence (e.g., information/data) that may be relevant to the analytical problem. The one or more servers can be configured to selectively permit a user access to the one or more databases associated with the analytical problem to be analyzed; present the evidence retrieved from the one or more databases to the user within a specified time period based on permitted access to the one or more databases; receive an outcome estimate from the user within the time period; and eliminate access to the evidence retrieved from the one or more databases in response expiration of the time period or in response to receiving the outcome estimate. The window available during the time period involves a component that trains the user to recognize and mitigate adverse cognitive biases and measures of cognitive ability and expertise of the user to generate a plurality of types of user performance scores based on activities of the user within the time period.

Among other things, it is an object of the present invention to provide a method, system and computerized process for bias-sensitive crowd-sourced analytical technique that does not suffer from the problems or deficiencies associated with conventional solutions.

It is still further an object of the present invention to provide a computerized process for a bias-sensitive crowd-sourced structured analytical technique that is quicker and more efficient to use asynchronously and over application environments including but not limited to those of smartphones. Embodiments of the computerized process can utilize one or more databases as a basis for forming a collaborative data space in which Decision-Makers, Impute blue-team members, and Refute red-team members can interact and utilize the computerized process. The computerized process can control access to and modification of the collaborative data space, and in turn, the one or more databases to ensure data integrity and consistency across simultaneous users of the computerized process as well as for the asynchronous use of the data space. The data space can provide create, read, update, and delete functions that can be utilized for data integrity and consistency and can use timed parameters to drive the simultaneous and asynchronous use of the collaborative data space for committing data in the collaborative data space to one or more databases.

Exemplary embodiments of the present disclosure are described more fully hereinafter with reference to the accompanying drawings, which are intended to be read in conjunction with both this summary, the detailed description and any combinations and/or permutations of embodiments described or otherwise disclosed here. Embodiments of the present disclosure can have many different forms and should not be construed as limited to embodiments set forth herein; rather, these embodiments are provided by way of illustration only and so that this disclosure will be thorough, complete and will fully convey the full scope of the present disclosure to those skilled in the art.

DETAILED DESCRIPTION

Embodiments of the present disclosure relate to a bias-sensitive crowd-sourced structured analytic technique in a collaborative environment.

Figure 1:
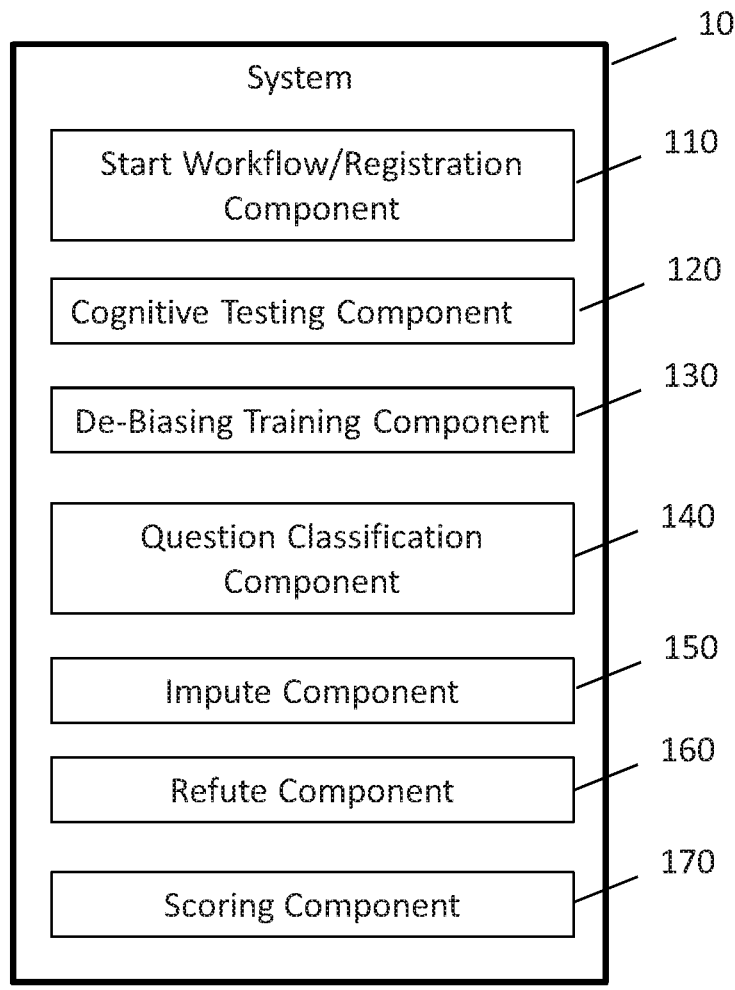
FIG. 1 is a block diagram of a bias-sensitive crowd-sourced analytic system in accordance with embodiments of the present disclosure.

FIG. 1 is a block diagram of a bias-sensitive crowd-sourced analytic system 10 in accordance with embodiments of the present disclosure. The system 10 can provide an intuitive binary structure that distributes cognitive effort across workflow processes and computing resources uniformly in a collaborative, blue-teamed/red-teamed environment that contains dedicated devil's advocacy; measures analytical outcomes with quantified accountability metrics; which evaluates and trains users on the cognitive principles and traits that high quality analysis requires; and whose software instantiation is produced with responsive design principles to facilitate speed, ease of use, data consistency, and efficient resource allocation; which facilitates crowd-sourced analysis. The system 10 can include a "Start Workflow"/Registration component 110, a Cognitive Testing component 120, a De-Biasing Training component 130, a Question Classification component 140, an Impute component 150, a Refute component 160, and Scoring component 170. One or more of the components 110, 120, 130, 140, 150, and/or 160 can include a timed component, which ends the processes of the component at the expiration of a time limit.

The "Start Workflow"/Registration component 110 allows a user to view or determine the problem being analyzed, receive performance scores and details on analytical workflow cases that are underway or concluded and retrieve information on their role within the workflow process. The Start Workflow/Registration component 110 can include a Registration Management System that supports user registration and management processes. The Registration Management system can provide the components for registering new users and capturing and storing user profile information. Users can be dynamically assigned to a Decision-Maker role, an Impute Crowd (blue-team) or a Refute Crowd (red-team) based at least in part on the information input by the users via the Start Workflow/Registration component 110. A Decision-Maker is the recipient of information from the Impute Crowd and the Refute Crowd and is responsible for entering a final response at the conclusion of the workflow process after evaluating the "wisdom" provided by the two crowds. Both the Impute Crowd and the Refute Crowd can have their own Moderator. The Moderator of each team can be dynamically assigned based on information input to or generated by the component 110 and/or the Scoring component 170. The Moderators of each team can facilitate collaborative discussion among their respective team members during group deliberation in the collaborative environment. The Moderators can be given the ability to mitigate counterproductive behaviors that can plague deliberating teams by requesting views of specific team members, thereby limiting the influence of highly active individuals who may dominate the discussion if left unchecked.

In the first instance, new users provide basic details such as demographic information and subject matter expertise information, along with other personal details in the Start Workflow/Registration component 110. Upon registering with the system 10, new users can be provided with anonymous identifiers so that their identities are not revealed to other users during the analytic workflow of the system 10. A workflow process runtime clock is customizable/configurable in the Start Workflow/Registration component 110 and the information/data input in the Start Workflow/Registration component 110 are recorded by an Administrator function within the Start Workflow/Registration component 110.

The Cognitive Testing component 120 is executed after initial registration and on the first time a user accesses the system 10 and can include a Cognitive Management System that can be responsible for supporting the Cognitive Testing processes. The Cognitive Testing component 120 can facilitate evaluation of users' innate analytical ability through key tests that include but are not limited to measurements of a user's Empathy Quotient, Systemizing Quotient, verbal IQ and confidence calibration. The results of these tests can be used by the system 10 to generate factored Cognitive Testing scores that can contribute to a Moderator Propensity Score calculated by the Scoring component 170, and can be used by system 10 to dynamically determine and assign Moderator roles to users in either the Impute Crowd, or the Refute Crowd.

The De-Biasing Training component 130 is designed to reduce judgment errors and flawed thinking through a series of modules (e.g., ten modules). The De-Biasing Training component 130 can include a De-Biasing Management System that can be responsible for providing client-side user interface components (e.g., graphical user interfaces), data management, APIs and overall workflow management of the De-Biasing Training. Each de-biasing module in the component 130 can be dedicated to explaining, demonstrating and quizzing users on one example of common thought process errors—known as cognitive biases. The responses to all available quiz questions are used to generate the user's Metacognition Score based on how well users answered the question in each De-Biasing Training module. Since registered users undergo the Cognitive Testing via the Cognitive Testing component 120 once during a first use of the system 10, subsequent use of the system 10 by a user automatically moves the user from Start Workflow/Registration component 110 to De-Biasing Training component 130. During the first use of the system 10, the system 10 prevents a user from proceeding to the next component in the system 10 until the user completes each of the de-biasing modules in the De-Biasing Training component 130. Upon subsequent use of the system 10, the system 10 does not require users to again complete the modules in De-Biasing Training component 130. Instead, users are given the option to selectively review modules pertinent to the current workflow process being implemented by the system. De-Biasing Training via the De-Biasing Training component 130 can build upon the evaluation of analytical propensity in Cognitive Testing component 120 by teaching users how to avoid logic flaws and judgment errors in an effort to improve their analytical abilities—a critical necessity for analysis if a user does not show a natural propensity for analysis. De-Biasing Training Metacognition Scores can be generated by the De-Biasing Training component 130 or the Scoring component 170 and these scores can be factored with scores from the Cognitive Testing component 120 by Scoring component 170 to produce the Moderator Propensity Score, which is used by the system 10 to dynamically assign the Moderator roles within deliberating groups in both Impute and Refute teams.

In some embodiments, each de-biasing module can be devoted to a two-panel display in a graphical user interface that sets up an explanation of a single metacognition concept (e.g., availability bias, confirmation bias, etc.) through the study of a single illustrated scenario with an accompanying multiple choice question. Each module can work as a game: the first panel presents the illustration and the question, and the second panel reveals the answer and provides feedback on whether the user got the right or the wrong answer. Answers can generate varying point scores. The points achieved on each module combine to attribute to a user's Metacognition Score, which can be an average of aggregated points per completed module. The points can be revealed after a user's first pass through the entirety of the de-biasing modules. The de-biasing modules can be delivered and presented to the user in various and unlimited forms and formats. For example, the de-biasing modules can be delivered and presented as audio, video, audiovisual, livestreamed multimedia data, and the like.

The Question Classification component 140 can be executed by the system after the De-Biasing Training component 130, and can permit assigned Decision-Makers to establish the type of process suitable for the problem being analyzed. The Question Classification component 140 can include a Classification Management component that can be responsible for supporting the client-side user interface components and Question Classification Component 140. Through a series of APIs, embodiments of the system manage the content (i.e., questions, subject matter categories, keywords, etc.) provided to the user to assist in classifying the type of question inject. The Question Classification component 140 can guide the Decision-Makers through a series of questions about the nature of input and output required by the problem, and can classify the question according to its subject matter. Since users can provide information regarding their subject matter expertise areas in the Start Workflow/Registration component 110 at the start of the workflow process, the Question Classification component 140 can be executed to facilitate matching the current problem being analyzed to the users who will become members of the two "crowds" in the workflow process: the Impute Crowd which is guided by the system 10 to the Impute Component 150 and the Refute Crowd which is guided by the system to the Refute Component 160. Matches in subject matter between the analytical problem and users can contribute as factors in the Moderator Propensity Score calculated by the Scoring component 170, and can lead to the dynamic designation of two team Moderators—one for the Impute Crowd and one for the Refute Crowd.

After users are dynamically assigned to their respective teams/crowds and a Moderator has been assigned to each crowd (i.e., Impute Crowd and Refute Crowd) by the system 10, the system 10 executes the Impute component 150 to initiate an Impute phase via a collaborative data space. In the Impute phase, the Decision-Maker can begin in an Impute A sub-section which consists of Verification. In the Verification sub-section, the Impute component 150 can be executed to present Decision-Maker with a series of questions regarding the problem. The Impute component 150 can include an Impute Management System that can be responsible for the overall management and user experience of the Impute phase. The Impute Management System can provide client-facing interface components (e.g., graphical user interfaces), manage the collaborative data space and data sources, provide publicly accessible APIs and drive the overall workflow needed during the Impute phase/process.

After the series of questions are presented, the Impute component provides a graphical user interface through which the Decision-Maker drafts an initial hypothesis and an initial contrarian (or countervailing) hypothesis to answer the analytical problem based on the available evidence (e.g., information/data). A hypothesis can be an outcome estimate as used herein. The hypothesis can be accompanied by a concise summary of reasoning for each of the two hypotheses, along with possible biases, and confidence ratings expressed as probability estimates that the Decision-Maker's stated hypotheses and reasoning are correct. The Verification sub-section can include sub-sections (e.g., seven sub-sections), which can be executed by the Impute component 150 and can be followed by the Decision-Maker to establish evidence via the collaborative data space supporting the reasoning and hypotheses. For example, a Veracity sub-section can be executed to assess whether the information source is identified and credible; a What sub-section can be executed for identifying key assumptions that can be made about the analytical problem and which assumptions can be made from fact, versus judgment, versus description, versus generalization; a Who sub-section can be executed to identify key actors associated with the analytical problem; a Where sub-section can be executed to consider whether location is relevant to solving the problem; a When sub-section can be executed to consider whether time is relevant to solving the problem; a Why sub-section can be executed to identify objectives, motivations, authority, legitimacy, competency and interests of key actors identified in Who sub-section; and a Miscellaneous sub-section can be executed to consider whether the information needed to solve the problem is available.

Another instance of the Impute component 150 can be simultaneously executed for each the individuals that make up Impute A Crowd, and the instances of the Impute component 150 can execute the same Verification process as the Decision-Maker for each member of Impute A Crowd, where each member of the Impute A Crowd individually records their own hypothesis and contrarian hypotheses in the collaborative data space based on the available evidence (e.g., data/information) in the collaborative data space, along with accompanying reasoning, possible biases and confidence ratings. Subsequently, Impute A Crowd members collaboratively assess their analysis as a group. The analyses of the Impute Crowd can be maintained separately and apart from the analysis of the Decision-Maker by the Impute component 150 until the Decision-Maker submits his/her draft hypotheses and reasoning. Subsequently, the results from the Impute Crowd can be returned to Decision-Maker so that they can be used in drafting Decision-Maker's first recorded estimate. The Impute component 150 can provide a limited time period for the Impute A Crowd members to collaboratively discuss each other's responses and update their own analysis. After the time period elapses, the Impute Crowd Moderator (e.g., selected by the Moderator Propensity Score) records the final hypothesis in the collaborative data space and each individual Crowd member individually separately registers their confidence ratings regarding the group hypothesis in the collaborative data space. Subsequently, Impute A Crowd responses (the group's and individuals' scores) are returned to the Decision-Makers by the Impute component 150 so that the Decision-Makers may choose to revise their own draft analysis after reviewing Impute A Crowd estimates. If Decision-Makers are permitted to gather outside information, they can augment their analysis by conducting information searches using a list of curated high quality information sources, as well as any number of mechanisms, including search engines, etc. Information gleaned from the Question Classification component 140 can aid in information gathering at this stage.

In some embodiments, in addition to the independent analysis conducted in individual users assigned to the Impute Crowd, the Impute Crowd can also undergo a group deliberation via the graphical user interface(s) generated by the system 10 to provide a final group hypothesis with individual team-member confidence ratings. Subsequently, these Crowd responses (the group's and individuals' responses) can eventually be shown to the Decision-Makers, who may choose to revise their own analysis after reviewing Impute Crowd's responses.

If a Decision-Maker is required to analyze problems with unknowable outcomes, the Impute component 150 directs a Decision-Maker through an Impute B sub-section, where the Impute component 150 provides a collaborative environment including one or more graphical user interface(s) in which a Decision-Maker works and interacts directly with the Impute Crowd, as opposed to Impute A where Decision-Maker and Impute crowds do not interact directly. The collaborative environment provided by the Impute component 150 allows a Decision-Maker and the Impute Crowd to first gather further evidence (e.g., data/information) as a team in a Base Rate and Image Check, and then to process information-gathering through a taxonomy of Political, Economic, Security, and Socio-Cultural forces. The objective of the Base Rate section is to determine a prior rate of occurrence of the analytical problem being analyzed. Impute B Crowd participants led by Impute Crowd Moderator then generate via the Impute component 150 a curated wiki template in the graphical user interface(s) that guides them through discussion to determine the best response as a group, along with reasoning, possible biases and confidence ratings before recording the final response that concludes Impute B workflow process. If scenarios are required to conclude the workflow process, Impute B participants as an integrated crowd led by Impute Crowd Moderator generate scenarios in the graphical user interface(s) with drivers, matrix and scenario canvas templates, the latter of which is associated with confidence ratings that serve as a final response in the Impute phase if scenarios or similar narrative and graphic responses are required.

In Base Rate, a news gathering API can be provided to the Decision-Makers and the Impute Crowd. The Decision-Makers and the Impute Crowd can use the API to enter relevant keywords to generate information on the problem being assessed. Guidance prompts can be issued to all users to maximize their efficiency in using Base Rate. The Base rate section can include curated databases and/or search engines to further generate information on the problem being assessed. In Image Check, an image recognition API can be provided so that when the Decision-Makers and the Impute Crowd encounter photos or images as part of their evidence, the Decision-Makers and Impute Crowd can check to see if they can find any further clues as to what the image reveals.

After using Base Rate and Image Check, the users in Impute A will receive a prompt via the graphical user interface(s) to extend analysis through Impute B (if applicable), which contains curated news-gathering databases and taxonomies (The Five Ws and The Four Forces), moderated wikis, as well as an option to generate deliverable outputs like scenarios. A key difference between Impute A and Impute B is that when Decision-Makers enter Impute B, they no longer remain in an individual setting: Decision-Makers are first guided to gather information following the rules of The Five Ws (which consists of a database of curated links from which users may gather more granular information) and The Four Forces (which contextualizes information according to a basic taxonomy consisting of Political, Security/Defense, Economic and Socio-Cultural categories), then they join members of an Impute Crowd within the moderated wiki of the graphical user interface(s). Within the wiki, the Decision-Makers and crowd members can follow the wiki template to arrive at a more thorough analysis of the unconstrained problem. The wiki template can allow users to share the additional information they have gathered in the collaborative data space and which can be subsequently committed to a database associated with the problem to being analyzed and made available to the Refute Crowd after the Impute phase is complete. At its conclusion, the wiki can prompt the Impute Crowd and Decision Makers to deliver a hypothesis, along with individual and group estimate and confidence ratings.

The generated results of both the Impute A sub-section and Impute B sub-section are sent to the Refute component 160, which can be executed to initiate a Refute phase. The Refute component 160 can include a Refute Management System that can be responsible for the overall management and user experience of the Refute phase/process. Embodiments of the Refute component 160 can provide the client-facing interface components (e.g., graphical user interfaces), manage the collaborative data space and data sources, provide publicly accessible APIs, and drive the overall workflow needed during the Refute phase. In the Refute phase, a different dedicated, dynamically assigned crowd can be identified by the system 10 as a red-team devil's advocate based on the results generated from the Impute A and B sub-sections. The Refute component 160 provides the graphical user interface(s) that allows the Refute Crowd to access the collaborative data space (as updated and modified by the Impute Crowd during the Impute phase). The Refute Crowd can assess the quality of thinking and analysis done by both Decision-Makers and Impute Crowd in Impute phase. For example, the Refute component 160 can be executed to assess the results of the Impute phase by establishing: 1. Information Gaps & Vulnerable Assumptions; 2. Unobserved Norms And Protocols That Will Affect The Answer; 3. Wishful Thinking In Analysis; and 4. Biases And Poor Metacognitive Practice. The Refute Crowd records its own hypothesis and confidence ratings in the collaborative data space via the graphical user interface(s) in the Refute component 160, both at the individual and team level, and the Refute component 160 sends the hypothesis and confidence ratings to the Decision-Maker prior to recording the Decision-Maker's final response in the collaborative data space and concluding the workflow process. If the Refute Crowd's hypothesis and confidence ratings are within a threshold of agreement with the analysis and results from the Impute phase, the Refute component 160 can prompt the Decision-Maker via the graphical user interface(s) to record a final answer to the analytical problem, with final confidence rating in the collaborative data space. If the Refute Crowd's hypothesis and confidence rating is outside a threshold of agreement with the Impute analysis, the Refute component 160 prevents the Decision-Maker from recording a final response in the collaborative data space and directs Decision-Makers back to the Impute component 160 to start the Impute process one more time to review information and thinking and revise their scores. Before the Decision-Makers are sent back into Impute phase, the Decision-Makers can be prompted by the system 10 to select and review De-Biasing Training individual modules in the De-Biasing Training component 130 if they wish. Their Metacognition Scores can be updated if they choose to review any modules. Once they pass through De-Biasing Training, the Decision-Makers make a second and final pass through the Impute phase, this time without the Impute Crowd, before recording a final answer in the collaborative data space. The second pass does not go through Refute phase a second time. The crowd-sourced and binary blue-team/red-team structure of Impute/Refute analysis is designed to draw users through an iterative analytical process in which crowd-aided knowledge assists in the formation of causal and predictive assessments through both information augmentation (Impute) and falsification (Refute) processes.

Quantified outcome accountability is an advantageous aspect of embodiments of the present disclosure because outcome scoring plays a key role in driving long-term analytical performance. At all key decision-making points, both Decision-Makers and crowd-members are required to deliver not only an estimate on the precision of their answers, but also a probability rating of their confidence in each response. In addition to providing answers to a given problem, individual Decision-Makers and crowd-members in both Impute A and Impute B provide a confidence rating on the probability scale ranging from 0 to 100%. In the Refute phase, members of the Refute Crowd are asked for answers to the given problem as well as confidence ratings. The outcome accountability component measures the marginal improvement or worsening of the Decision-Makers' estimates from reviewing the materials generated by thee Impute Crowd and, subsequently, the adversarial response from the members of the Refute Crowd.

The Scoring component 170 can generate one or more scores for each of the users of the system 10. The scores can be used as a measure of each user's analytical abilities and accountability. Examples of the scores generated by the Scoring component include Metacognition Scores and the Moderator Propensity Score. Users can receive scoring feedback comprised of a combination of three measures: accuracy; impact; and rigor (collectively referred to by the acronym AIR). That is, users of the system can be scored and ranked on some combination of accuracy, impact and rigor.

First, accuracy measures will be based on the accuracy of probabilistic estimates attached to the hypotheses (Accuracy, the A in AIR). Accuracy measures will be based on the Brier score (Brier, 1950), a strictly proper scoring rule, which will be adapted to accommodate open-ended problems without pre-defined answer options.

Second, Impute and Refute teams will be scored on the impact of their analyses on the accuracy of the Decision-Makers (Influence, the I in AIR). Because the Decision-Makers are asked to provide hypotheses and confidence ratings independently at first, then update after reviewing the work of each of the Impute and Refute Crowds, the Decision Makers' incremental accuracy improvements can be accessed before versus after reviewing the work of each team. Thus, the Impact scores for Impute and Refute Crowds are based on the changes of Accuracy scores of the decision makers.

Third, the Decision-Makers can assess the rigor of the hypotheses and rationales produced by independent (pre-deliberation) participants from Impute and Refute Crowds (one rating per individual), as well as the team-based hypotheses and rationales (one rating per team) (AIR 3). In some embodiments, the Decision-Maker rigor ratings can be expressed on a 5-point scale, based on the following criteria: 1. Prior Experience/Expertise, 2. Insight, 3. Independence, 4. Cogency of Reasoning, and 5. Persuasiveness. In some embodiments, the Decision-Maker rigor ratings can be expressed on more granular rating scales (e.g., a 10-point scale) not addressed by accuracy and impact measures, such as assessment of evidence, assessment of assumptions, review of counter-arguments and key unknowns, to give a few examples. All scores are made available after participants have completed their work and the analytical problems are closed. The first and second measures (A and I) are available for problems with knowable correct answers, after the answers become known. Only the third measure (Rigor) is used for open-ended problems with unknown or unknowable answers.

The following secondary measures can be applied to users of the system, but may not be used to rank team performance.

a) Insight score (shown to participants during group deliberations; encourages meaningful team participation). The Insight score is generated by team members, who may choose to up-vote insightful contributions of their team members during group deliberation.

b) Civility score (shown during group deliberations; encourages contributions toward a productive team environment). The Civility score is based on team member ratings; team members can up-vote specific comments during group deliberations that contribute to a productive team environment or down-vote comments that contribute to an uncivil, unproductive environment.

c) Metacognition Score, from De-Biasing Training component 130 (shown; encourages metacognition development). The Metacognition score is based on responses to the Cognitive Testing component.

d) Results of individual difference measures (results not shown)

e) Moderator Propensity Score (not shown; used to assign Moderator role).

Exemplary embodiments of the system 10 can also include a Decision Management System and an Administration System. The Decision Management System can be responsible for the experience of the users that are assigned the Decision-Maker roles. The Decision Management System can provide client-facing interface components, manage data sources, and provide data from the Impute and Refute processes. The Administration System can be responsible for providing administrators the ability to perform various tasks throughout electronic instantiations of the system 10. Administrators can perform various tasks around opening, closing and scoring questions, sending messages to participants, view rationales, hypotheses and confidence ratings across teams and users and other general administrative tasks across the system.

As part of the workflow process, embodiments of the system can also integrate API services utilizing machine learning to process natural language sources. The modularity of the system 10 can accommodate use of custom or external, third-party API services. For example, API services that utilize machine learning can be connected to one or more of the components of the system 10, such as the Start Workflow/Registration Component 110, the Question Classification component 140, the Impute component 150, the Refute component 160, and the Scoring component 170. Examples of API services can include, but are not limited to topic modeling of news articles; recommender systems that suggest additional reading material to users; image analysis and recognition; news gathering on a topic; language translators; text-based sentiment-analysis and the like. Another set of API services can automate administrative functions, such as timing, scoring, question classification; and any other suitable API services.

Figure 2:
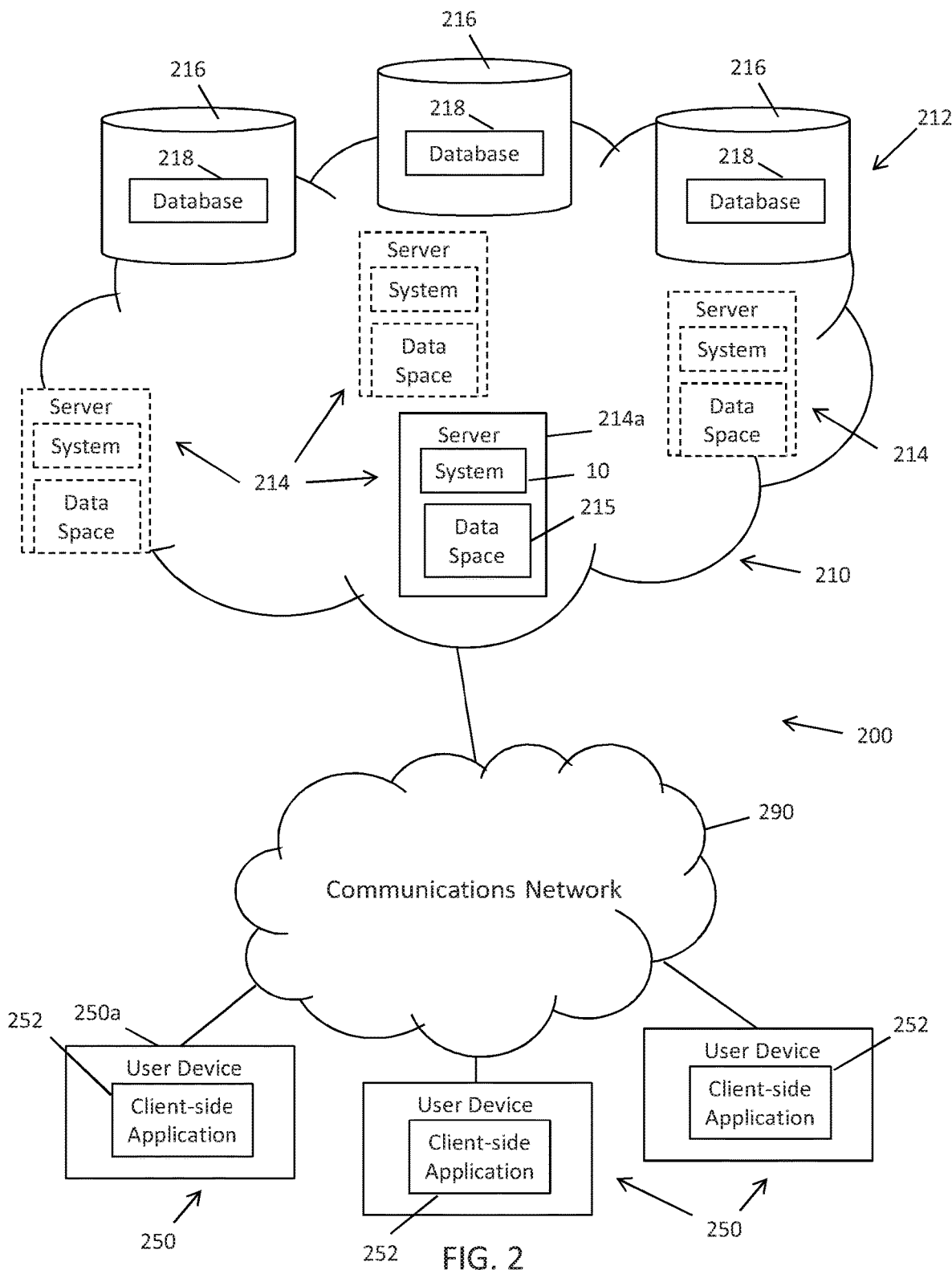
FIG. 2 is an exemplary networked environment for implementing the bias-sensitive crowd-sourced environment in accordance with embodiments of the present disclosure.
Figure 3:
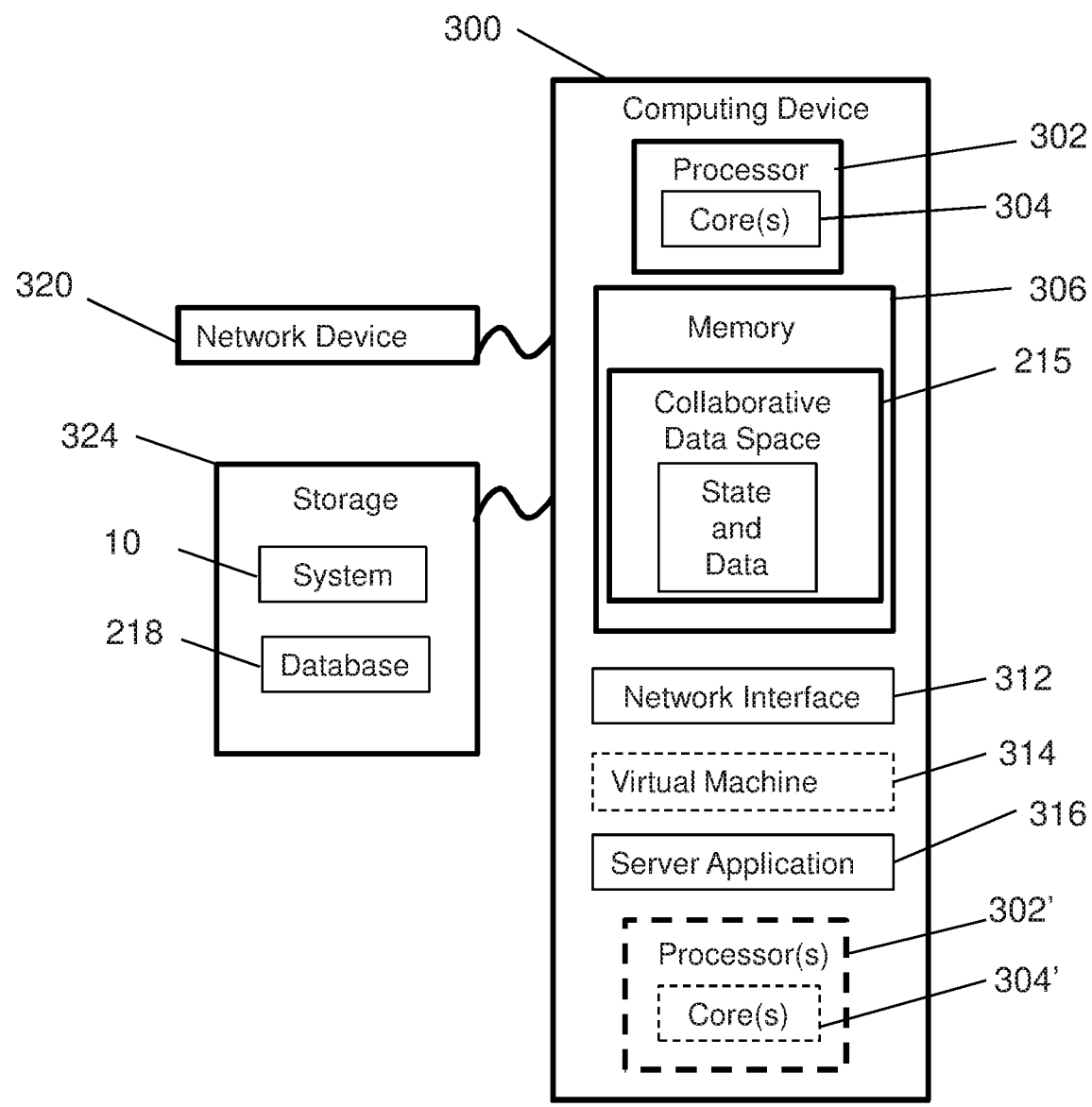
FIG. 3 is a block diagram of an exemplary computing device for implementing one or more of the servers in accordance with embodiments of the present disclosure.

FIG. 2 shows a computing environment within which embodiments of the present disclosure can be implemented. As shown in FIG. 2, the environment 200 can include distributed computing system 210 including shared computer resources 212, such as servers 214 and (durable) data storage devices 216, which can be operatively coupled to each other. For example, two or more of the shared computer resources 212 can be directly connected to each other or can be connected to each other through one or more other network devices, such as switches, routers, hubs, and the like. Each of the servers 214 can include at least one processing device and each of the data storage devices 216 can include non-volatile memory for storing databases 218. The databases can store analytical problems to be analyzed as well as gathered evidence (e.g., information/data) that may be relevant to the analytical problem. The evidence can include, for example, text documents, URLs, webpages, articles, audio files, video files, image files, spreadsheets, e-mails, SMS messages, social media content, and/or any suitable information/data. An exemplary server is depicted in FIG. 3.

Any one of the servers 214 can implement instances of the system 10 and/or the components thereof. In some embodiments, one or more of the servers 214 can be a dedicated computer resource for implementing the system and/or components thereof. In some embodiments, one or more of the servers 214 can be dynamically grouped to collectively implement embodiments of the system 10 and/or components thereof. In some embodiments, one or more servers can dynamically implement different instances of the system 10 and/or components thereof.

Figure 4:
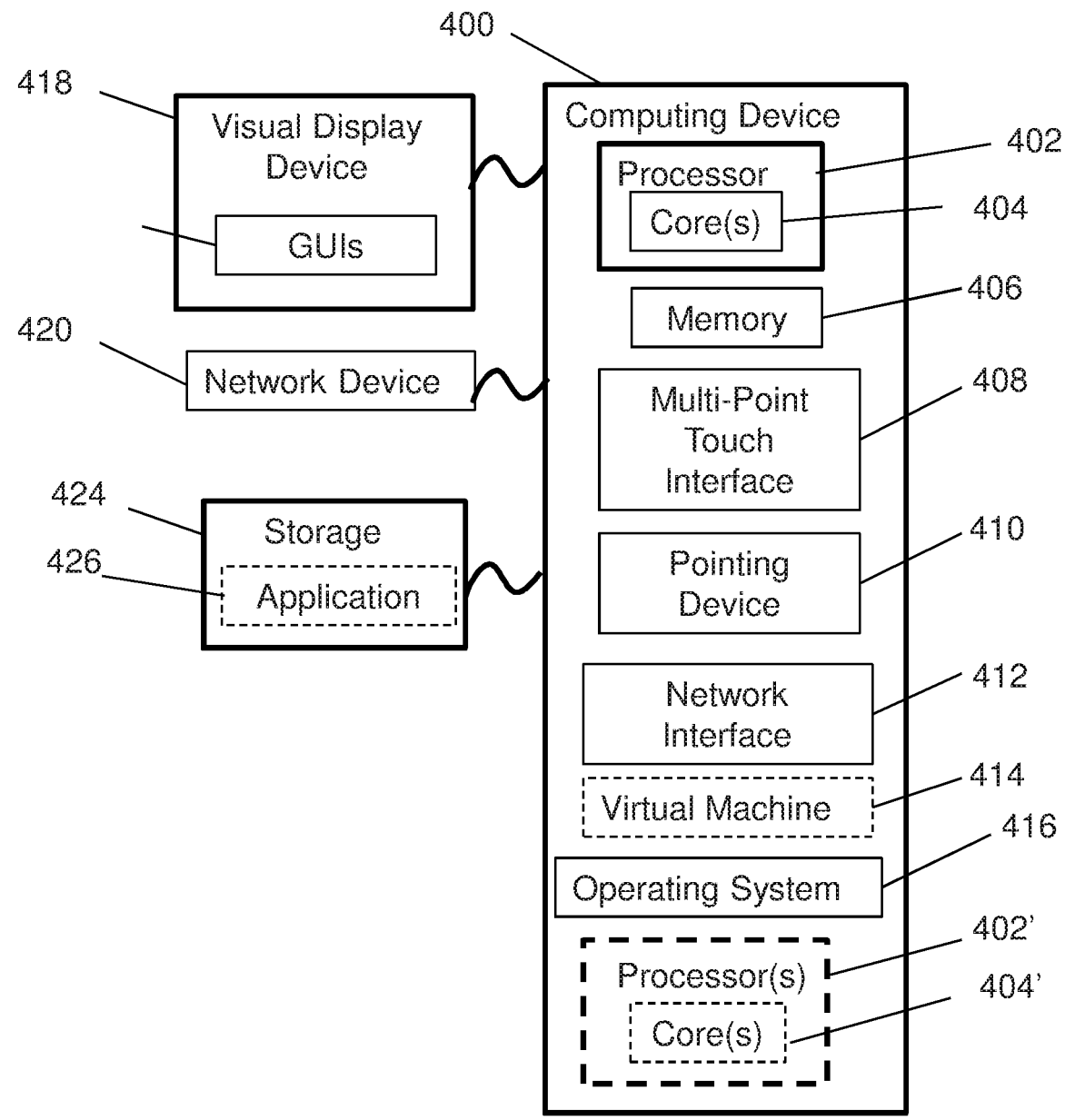
FIG. 4 is a block diagram of an exemplary computing device for implementing one or more of the user devices in accordance with embodiments of the present disclosure.

The distributed computing system 210 can facilitate a multi-user, multi-tenant environment that can be accessed concurrently and/or asynchronously by user devices 250. For example, the user devices 250 can be operatively coupled to one or more of the servers 214 and/or the data storage devices 216 via a communication network 290, which can be the Internet, a wide area network (WAN), local area network (LAN), and/or other suitable communication network. The user devices 250 can execute client-side applications 252 to access the distributed computing system 210 via the communications network 290. The client-side application(s) 252 can include, for example, a web browser and/or a specific application (e.g., a mobile application) for accessing and interacting with the system 10. An exemplary user device is depicted in FIG. 4.

In exemplary embodiments, the user devices 250 can initiate communication with the distributed computing system 210 via the client-side applications 252 to establish communication sessions with the distributed computing system 210 that allows each of the user devices 250 to utilize the system 10, as described herein. For example, in response to the user device 250a accessing the distributed computing system 210, the server 214a can launch an instance of the system 10, which can generate an instance of the Start Workflow/Registration component 110 if it is the user's first time interacting with the system 10. Otherwise, the server can execute the system 10 to generate an instance of the De-Biasing Training component 130 or the Question Classification component 140. In embodiments which utilize multi-tenancy, if an instance of the system 10 has already been launched, the instance of the system 10 can process multiple users simultaneously. The server 214a can execute instances of each of the components of the system 10 according to the workflow process as described herein. Users can interact in a single shared session associated with the system 10 and components thereof or each user can interact with a separate and distinct instance of the system 10 and components thereof and the instances of the systems and components thereof can be linked to facilitate cross communication between the instances to facilitate simultaneous and concurrent interaction with the system while providing data consistency and integrity.

Upon being launched, the system 10 can identify the current state of the data stored in the databases in data storage locations of one or more of the data storage devices 216. For example, the server 214a can read the data from the databases in one or more data storage devices 216 and can store the current state and data values in one or more memory devices across one or more of the servers 214 to create a cache of the state and data (e.g., the server 214a can create an in-memory version of the state and data from databases). The state and data retrieved can be related to an analytical problem to be analyzed via embodiments of the system 10. Based on the cached state and the system 10 executed, for example, by the server 214a, the workflow process can begin and can identify users of the system (including those contemporaneously registering with the system and those that have previously registered with the system) and can dynamically assign the users roles (e.g., as Decision-Makers, Impute Crowd members, Refute Crowd members, Impute and Refute Moderators, etc.).

The server 214a can execute the system 10 to generate a collaborative data space 215 based on the in-memory version of the state and data associated with the analytical problem to be solved and can control access to the collaborative data space 215 based on the assigned roles of the users. The collaborative data space 215 can be a range of logical or physical memory locations in one or more servers that corresponds to a separate persistently stored database or portion thereof. The collaborative data space 215 can be presented to users by one or more data structures that are configured to present the state and the data associated with the analytical problem to be analyzed. The data structures can include Extensible Markup Language (XML) files, hypertext markup language (HTML) files, wikis (using a wiki markup), and the like. The users can interact with the collaborative data space 215, e.g., via the client-side applications, simultaneously, asynchronously, independently, and/or collaboratively via the one or more data structures to modify the in-memory data. The data structures can be utilized to create one or more windows in one or more graphical user interfaces to facilitate the workflow process associated with a structured analytic technique.

The collaborative data space 215 can provide, simultaneously and concurrently, access as well as asynchronous access to the data associated with the analytical problem to be analyzed to users that have been assigned corresponding roles. The server 214a, in response to execution of the components of the system 10, can limit the time in which users can have access to the collaborative data space 215 based on a timing/continuous clock functionality component associated with the system 10. For example, the server 214a can be configured to selectively render a sequence of timed windows on the user devices associated with different groups of user devices (e.g., those associated with the Impute Crowd, the Refute Crowd, and the Decision-Maker) based on the continuous clock functionality. The server 214a executing the system can dynamically update access provision to the collaborative data space 215 including data/information therein or associated therewith to individuals and Crowds (i.e. Impute Crowd and Refute Crowd). The system 10 can be executed by the server 214a to prompt users via the timed windows for their input or notify users of newly available inputs in the collaborative data space 215 at different stages of the analytic process performed via the system 10. Users can gain or lose access to the collaborative data space 215 based on their role in the system (e.g., Decision-Maker, Impute Crowd member, Refute Crowd member) and based on the current point in the process and/or the components of the system that are executing the process. For example, users can gain access to the collaborative data space 215 and data/information included therein or associated therewith when other parties have completed and submitted their work (e.g., submitted a final hypothesis) and/or when a time period expires for a particular section, component, or phase on the system. Likewise, a user can lose or be denied access to the collaborative data space 215 when a time period allocated for response has expired; other users have started work; the Decision-Maker has submitted a decision (e.g., a final hypothesis); and/or other users have started work. Quantitative metric of work progress and time left for the task can be shown to user by the system throughout the process. Notifications can be sent to the user devices (e.g., via the client-side applications) at the time the user gains and loses access to a specific portion of the collaborative data space.

If the data/information is loaded into the collaborative data space 215 or otherwise available and a user device is online, the user's client-side application can automatically download the data/information, but only displays the data/information to the user at the appropriate time. For example, a user device associated with a user of the Impute Crowd can be in communication with the server(s) 214, but the time for the user to access and view the data/information associated with the analytical problem to be analyzed may not have arrived. In such circumstances, the server 214*a* can send the data/information to the user device and can maintain control of the access permissions to data/information (e.g., via the client-side application) until the Impute component 150 is executed for the analytical problem starting the Impute process.

If a user A has entered information (e.g. typed text) and a new piece of relevant information from user B has become available in the collaborative data space 215, the server can execute the system 10 to prevent the user A from submitting his/her decision/judgment until he/she has reviewed the new piece of information. One user's action (viewing a document, entering text) may affect access provisions of another user. Whether or not a document is reviewed may be based on time spent on a given screen or user action (clicking a "Submit" button). The system can track whether all information in the collaborative data space 215 has been reviewed by each user and can highlight any relevant but unseen information for each user.

As one example, the users assigned to the Impute Crowd and Decision-Makers can be dynamically granted access to the collaborative data space 215 during the Impute phase, during which users can interact with the data space 215 via the graphical user interface(s) to read, write, delete, or add the in-memory version of the data in the collaborative data space 215. During the Impute phase, the users assigned to the Refute Crowd can be prevented from accessing the collaborative data space 215. Changes made by one of the users assigned to the Impute Crowd and the Decision-Makers can be propagated through the system 10 such that the instance(s) of the system generated for analyzing the specific analytic problem are updated and the other users of the Impute Crowd receive the changes to the data as the changes are made to the collaborative data space 215. For example, in response to receiving a change to the data from a user in the collaborative data space 215, the system 10 can initiate a reload command for each instance of the system 10 so that the graphical user interface(s) being viewed by the other users is automatically updated to reflect the change to the data in the collaborative data space 215. In some embodiments, the reload can be configured to occur periodically (e.g., every 10 seconds).

After a specified time period lapses, completing the Impute phase, access to the collaborative data space by the users assigned to the Impute Crowd is prevented/blocked and the server executing the system commits the changes to the collaborative data space, including the in-memory state and data associated with the specific analytical problem to be analyzed, to the one or more databases (e.g., by performing one or more create, read, update, delete functions). Allowing the users to interact with the collaborative data space can promote an efficient and responsive allocation of resources and can facilitate the simultaneous and concurrent access to data, while at the same time avoiding potential data collisions, data consistency problems, and data integrity problems that may otherwise exist if the data was being read and modified directly in the database(s). Committing the changes to the data when the specified time period lapses ensures that the state and data are captured and stored in the databases prior to the next phase of the workflow process. This provides the system 10 with a known and reliable save point from which the workflow process can continue, and ensure that the next phase of the workflow process is utilizing the current data set.

When the Refute phase begins, the users assigned to the Refute Crowd and the Decision-Makers are granted access to the collaborative data space 215 by the server 214*a* executing the system 10. An archival copy of Impute Crowd's work product is saved in the collaborative data space 215 and cannot be modified further. Changes in the data by one of the users assigned to the Refute Crowd and the Decision-Makers can be propagated through the system 10 such that the instance(s) of the system 10 generated for analyzing the specific analytic problem are updated and the other users of the Refute Crowd receive the changes to the data in the collaborative data space 215. For example, in response to receiving an update request for the data from a first user via the collaborative data space 215, the system 10 can initiate a reload command for each instance of the collaborative data space 215 so that the graphical user interface of the other users is automatically updated to reflect the change to the data in the collaborative data space 215. In some embodiments, the reload can be configured to occur periodically (e.g., every 10 seconds).

After a specified time period lapses, completing the Refute phase, access to the collaborative data space 215 by the users assigned to the Refute red-team is prevented and the server commits the changes to the collaborative data space 215, including the in-memory state and data associated with the specific analytical problem to be analyzed, to the one or more databases (e.g., by performing one or more create, read, update, delete functions). Committing the changes to the data when the specified time period lapses ensures that the state and data are captured and stored in the databases prior to the next phase of the workflow process. This provides the system 10 with a known and reliable save point from which the workflow process can continue, and ensure that the next phase of the workflow process is utilizing the current data.

The servers 214 can restrict access to the memory locations in the data storage devices corresponding to the databases during the workflow process to specific times such that the state and data stored in the databases cannot be read, updated, or deleted except at those specific times. Restricting access to the memory locations storing the databases can prevent concurrent access to the storage locations and can prevent the system 10 or other applications from displaying an outdated state and data. As one non-limiting example, after loading the state and data into the memory of the server(s) 214, the server(s) 214 can restrict access to memory locations associated with the state and data by locking the memory locations to prevent reads or writes from occurring with respect to the locked memory locations.

In exemplary embodiments, the server 214a can dynamically display textual information within the sequence of timed windows. The timed windows can be created by the server 214a based on access permissions to the collaborative data space and according to a continuous clock functionality being executed by the one or more servers. The sequence of timed windows can be rendered on the user devices to include automatic relocation of text information between the timed windows upon expiration of specified time intervals and the timed windows can be rendered on different groups of the user devices based on the continuous clock function. As an example, the sequence of time windows created by the server 214a can include a (first)) window created during the Impute phase that contains textual information from the collaborative data space. The window can be rendered on the user devices associated with the Impute Crowd. The textual information in the window can guide the members of the Impute Crowd through a review of evidence.

A (second) window can be rendered by the server 214a on the user devices associated with the Impute Crowd. The window can reveal the status of evidence being analyzed and probabilistic estimates of evidence being analyzed. A (third) window can be rendered on the user devices associated with the Impute Crowd and can provide a computer-mediated synchronous communication interface through which the Impute Crowd debates the evidence in a contemporaneous forum, and within a (first) timed interval, provide probability estimates on hypothesized outcomes. The timed interval can be implemented by the continuous clock functionality executed by the server 214a. The textual information of the first, second and third windows can be relocated by the server 214a to a (fourth) window automatically upon expiration of the first timed interval. The fourth window can be rendered on the user devices associated with the Decision-Makers and can be configured to receive a separate estimate. The text information from the fourth window can be relocated to a (fifth) window when the Refute Crowd is permitted to review the textual information. The Refute Crowd can be permitted to review the textual information upon expiration of a (second) timed interval. The Refute Crowd can generate a group estimate via the fifth window, and the relocated textual information can be returned by the server 214a from the fifth window back to the fourth window to prompt the Decision-Makers for a final estimate. The user device associated with the Decision-Maker can be automatically routed to the beginning of the workflow process by the server 214a in response to a specified degree of disparity in the final estimate and the group estimate.

FIG. 3 is a block diagram of an exemplary computing device 300 for implementing one or more of the servers in accordance with embodiments of the present disclosure. In the present embodiment, the computing device 300 is configured as a server that is programmed and/or configured to execute one of more of the operations and/or functions for embodiments of the environment described herein (e.g., system 10) and to facilitate communication with the user devices described herein (e.g., user device(s) 250). The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the components/modules or portions thereof described herein as being implemented, for example, by the servers 214 and/or can provide a cache for maintaining the collaborative data space 215 including the state and data associated with an analytical problem to be analyzed stored by one or more data storage devices operatively coupled to the computing device 300. The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device may be shared dynamically. One or more virtual machines 314 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 may include or be operatively coupled to one or more data storage devices 324, such as a hard-drive, CD-ROM, mass storage flash drive, or other computer readable media, for storing data and computer-readable instructions and/or software that can be executed by the processing device 302 to implement exemplary embodiments of the components/modules described herein with reference to the servers 214.

The computing device 300 can include a network interface 312 configured to interface via one or more network devices 320 with one or more networks, for example, a Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. While the computing device 300 depicted in FIG. 3 is implemented as a server, exemplary embodiments of the computing device 300 can be any computer system, such as a workstation, desktop computer or other form of computing or telecommunications device that is capable of communication with other devices either by wireless communication or wired communication and that has sufficient processor power and memory capacity to perform the operations described herein.

The computing device 300 may run any server application 316, such as any of the versions of server applications including any Unix-based server applications, Linux-based server application, any proprietary server applications, or any other server applications capable of running on the computing device 300 and performing the operations described herein. An example of a server application that can run on the computing device includes the Apache server application.

FIG. 4 is a block diagram of an exemplary computing device 400 for implementing one or more of the user devices (e.g., user devices 250) in accordance with embodiments of the present disclosure. In the present embodiment, the computing device 400 is configured as a client-side device that is programmed and/or configured to execute one of more of the operations and/or functions for embodiments of the environment described herein (e.g., client-side applications 252) and to facilitate communication with the servers described herein (e.g., servers 214). The computing device 400 includes one or more non-transitory computer-readable media for storing one or more computer-executable instructions or software for implementing exemplary embodiments of the application described herein (e.g., embodiments of the client-side applications 252). The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions, code or software for implementing exemplary embodiments of the client-side applications 252 or portions thereof.

The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions, code, or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, MRAM, EDO RAM, and the like. Memory 406 may include other types of memory as well, or combinations thereof.

A user may interact with the computing device 400 through a visual display device 418, such as a computer monitor, which may be operatively coupled, indirectly or directly, to the computing device 400 to display one or more of graphical user interfaces that can be provided by the client-side applications 252 and/or the system 10 in accordance with exemplary embodiments. The computing device 400 may include other I/O devices for receiving input from a user, for example, a keyboard or any suitable multi-point touch interface 408, and a pointing device 410 (e.g., a mouse). The keyboard 408 and the pointing device 410 may be coupled to the visual display device 418. The computing device 400 may include other suitable I/O peripherals.

The computing device 400 may also include or be operatively coupled to one or more storage devices 424, such as a hard-drive, CD-ROM, or other computer readable media, for storing data and computer-readable instructions, executable code and/or software that implement exemplary embodiments of an application 426 or portions thereof as well as associated processes described herein.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the processes and/or operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the processes and/or operations described herein. In exemplary embodiments, the operating system 416 may be run in native mode or emulated mode. In an exemplary embodiment, the operating system 416 may be run on one or more cloud machine instances.

Figure 5:
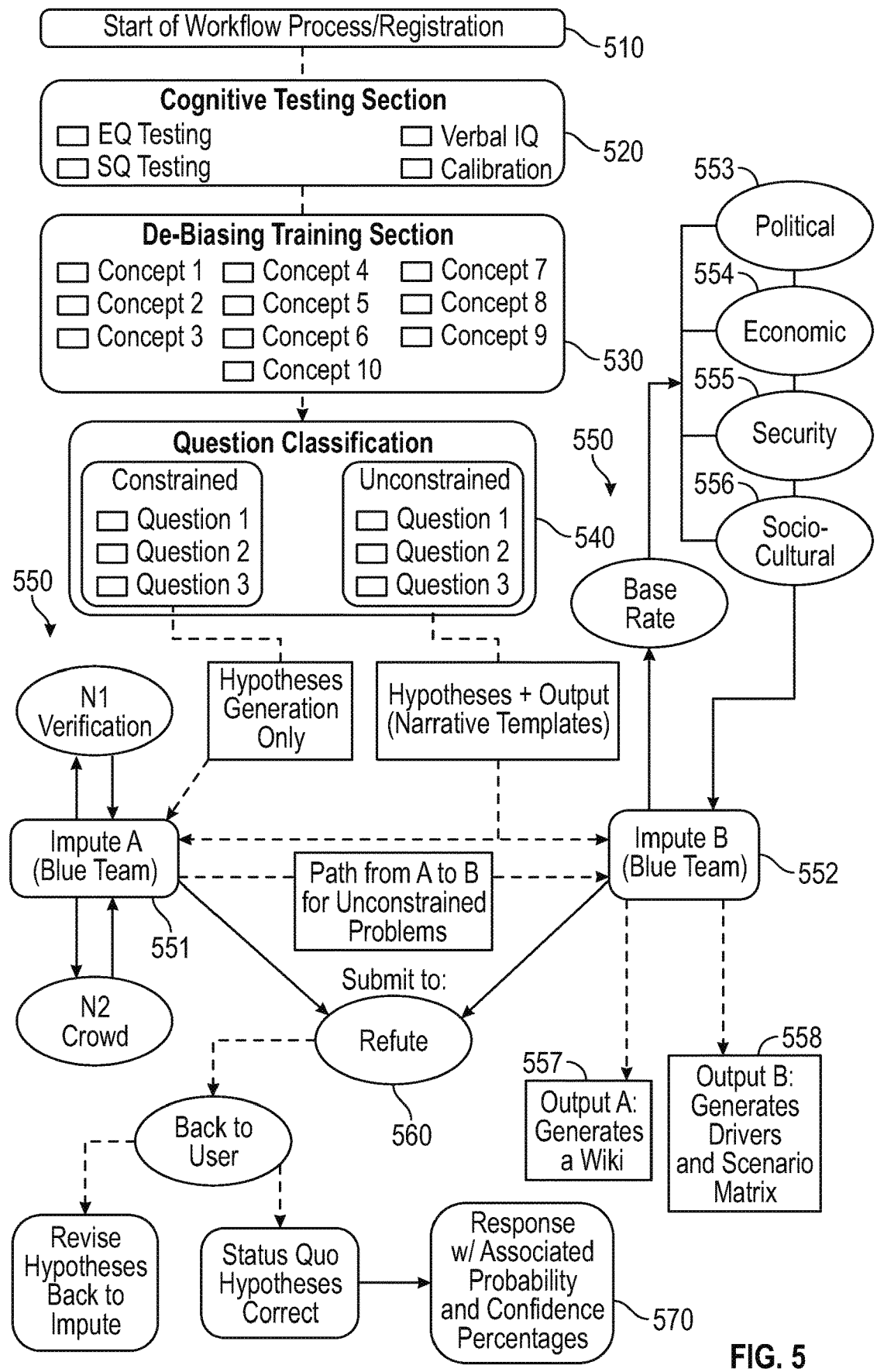
FIG. 5 shows a schematic diagram of an exemplary workflow process illustrating a user experience for embodiments of the system in accordance with the present disclosure.

FIG. 5 shows a schematic diagram of an exemplary workflow process illustrating a user experience for embodiments of the system in accordance with the present disclosure. FIGS. 6-12 show various windows that can be generated for the workflow process shown in FIG. 5. Referring to FIG. 5, the workflow process begins with the Start Workflow/Registration phase 510 implemented by the Start Workflow/Registration component 110 shown in FIG. 1, a window in the graphical user interface can facilitate user registration with the system and input of information by users that can be utilized by the system to assign users to specific roles during the workflow process. During the Start Workflow/Registration phase 510, users can provide basic details such as name, age, gender, and subject matter expertise information, along with other personal details that help in directing user roles within the workflow process. A workflow process runtime clock is customizable for this phase. All details input via the window in the graphical user interface(s) during the Start Workflow/Registration phase 510 are recorded in the database(s) by the Administrator function within Start Workflow/Registration component 110.

After users complete the start workflow/registration phase, the system can move to a cognitive testing phase 520 implemented by Cognitive Testing component 120 shown in FIG. 1. In their first use of the system, after initial registration, the Cognitive Testing phase 520 can evaluate each user's analytical ability through key tests that include but are not limited to measuring a user's Empathy Quotient, Systemizing Quotient, verbal IQ and confidence calibration. A factored score of these tests contributes to a Moderator Propensity Score determining assignation of the Moderator role among users in either the Impute Crowd or the Refute Crowd within the workflow process.

Figure 6:
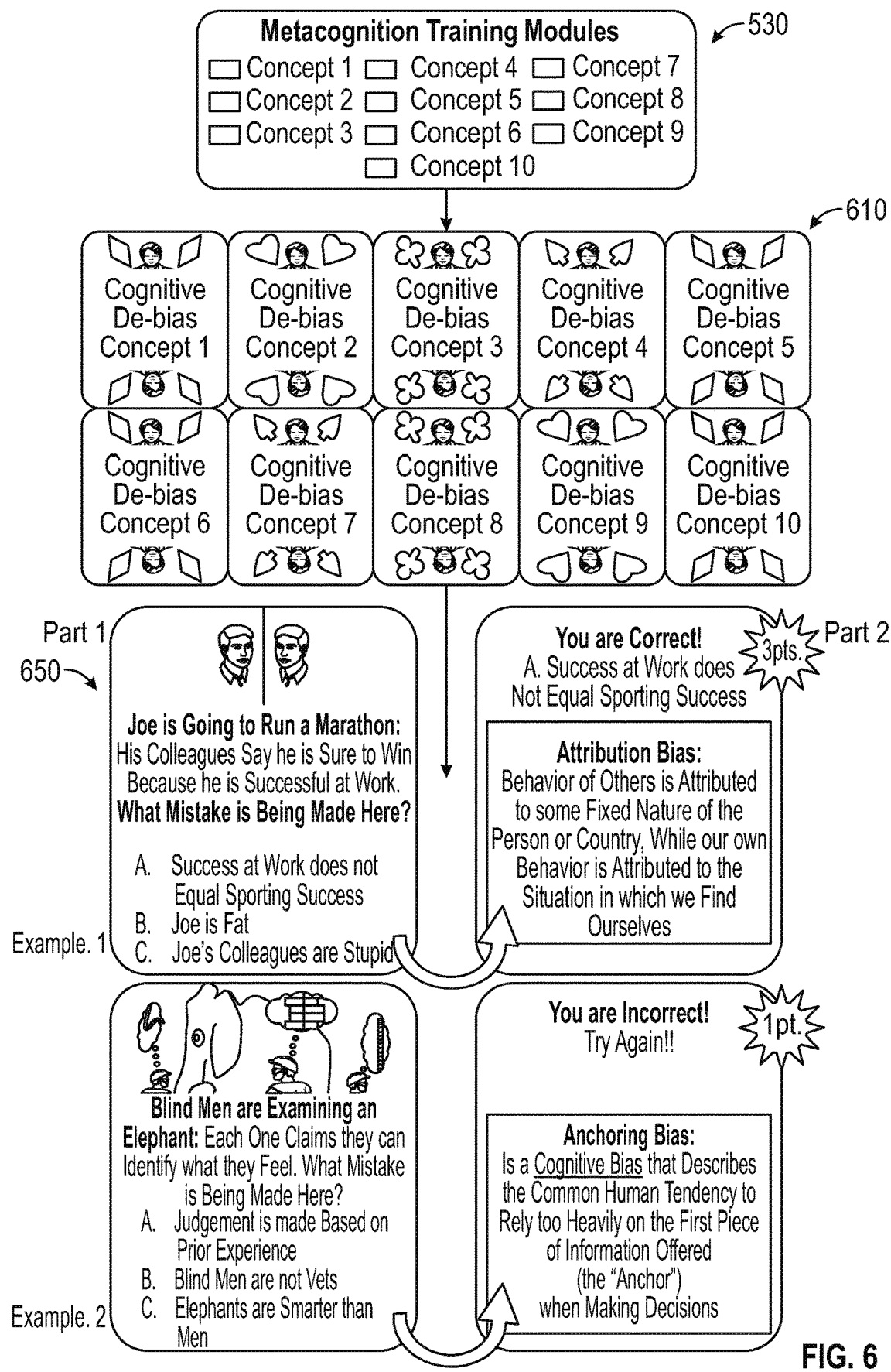
FIG. 6 depicts a window that can be generated to provide a detailed view of an aspect of an embodiment of the de-biasing training phase of the process of FIG. 5.

Subsequently, referring to FIGS. 5 and 6, users are guided through a series of modules 610 in a De-Biasing Training phase 530 implemented by De-Biasing Training component 130 shown in FIG. 1. The modules 610 can be rendered in a window 650 on user devices associated with the users of the system by the one or more servers executing the De-Biasing Training component 130. Each of the modules 610 are dedicated to explaining, demonstrating and quizzing users on one example of common thought process errors—such as cognitive biases—and which generate the user's Metacognition Score based on how well users answered the question in each De-Biasing Training module. Since registered users only undergo Cognitive Testing phase 520 once during the first use of present invention, subsequent uses of the system move the user from Start Workflow/Registration phase 510 straight to De-Biasing Training phase 530 on every use thereafter. During the first use of the system, users must complete all modules 610 of De-Biasing Training phase 530 and cannot proceed to the next phase without completing all modules 610. Upon subsequent use of the system, users are not required to complete all modules 610 in De-Biasing Training, but are instead given the option to selectively review modules 610 pertinent to the workflow process. De-Biasing Training builds upon the evaluation of analytical propensity in Cognitive Testing by teaching users how to avoid logic flaws and judgment errors in an effort to improve their analytical abilities—a critical necessity for analysis if a user does not show a natural propensity for analysis. De-Biasing Training Metacognition Scores are factored with Cognitive Testing scores to produce the said Moderator Propensity Score, which is used to assign the Moderator roles within crowd deliberation in both Impute and Refute.

Figure 7:
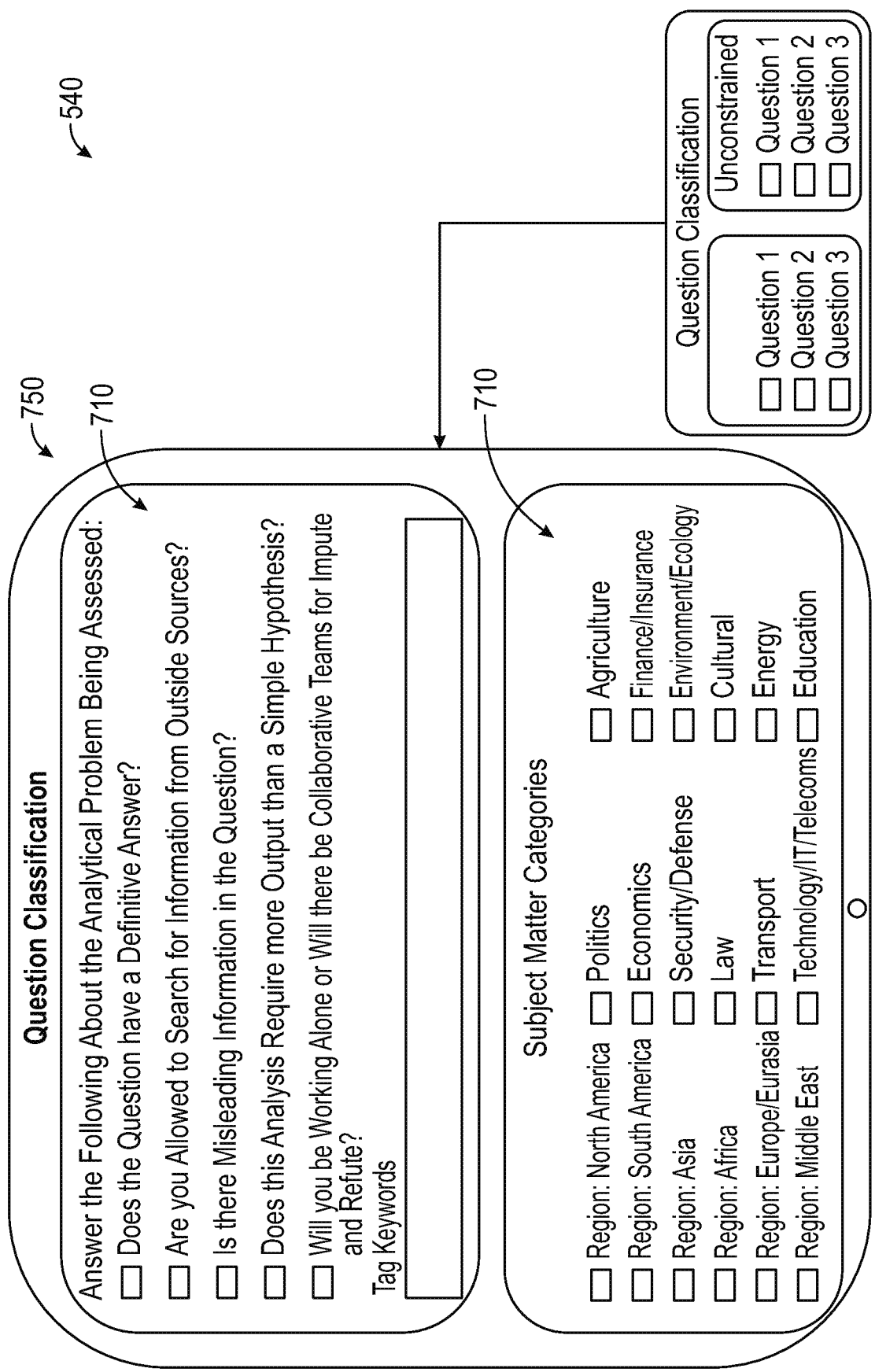
FIG. 7 depicts a window that can be generated to provide a detailed view of an aspect of an embodiment of the question classification phase of the process of FIG. 5.
Figure 8:
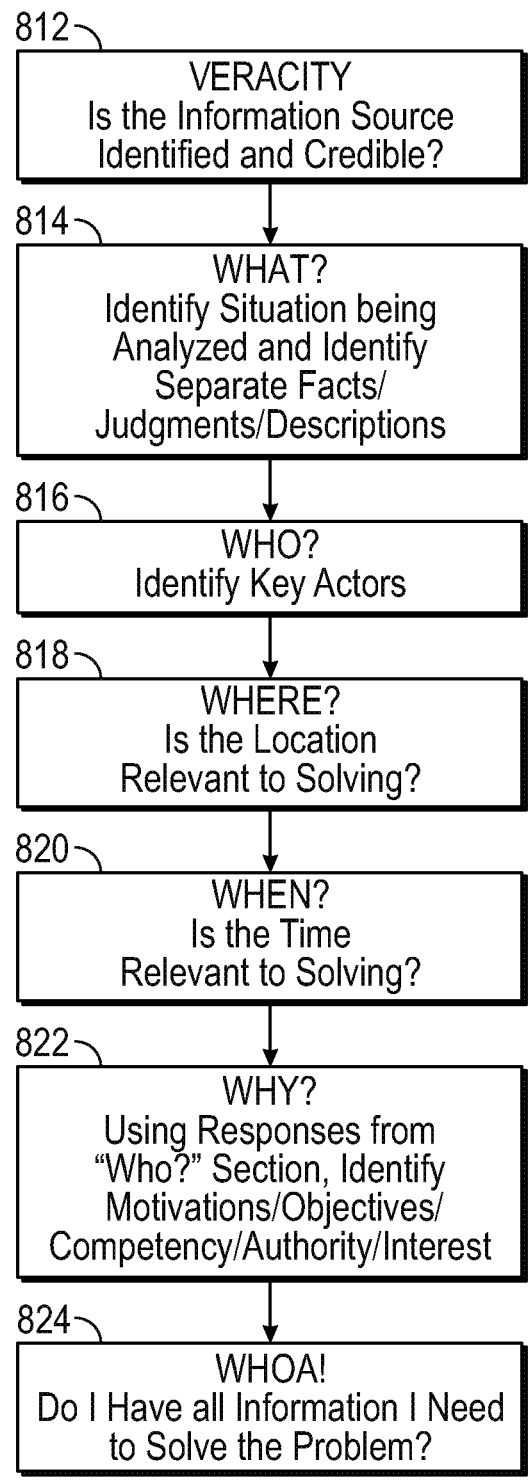
FIG. 8 shows a more detailed view of an aspect of an embodiment of the Impute A phase of the process of FIG. 5.

Referring to FIGS. 5 and 7, in a question classification phase 540 implemented by the Question Classification component 140 shown in FIG. 1, Decision-Makers are permitted to establish what type of workflow process is required by the problem being analyzed through answering a series of questions 710 about the nature of input and output required by the problem and classifying the question according to its subject matter. The series of questions can be rendered in a window 750 on user devices associated with the users of the system by the one or more servers executing the Question Classification component 140. Since users provide information regarding their areas of subject matter expertise in the Start Workflow/Registration phase 510 at the start of the workflow process, the Question Classification phase 540 permits matching between the problem and users who will become members of the two "crowds" (i.e. the Impute Crowd and the Refute Crowd) in the workflow process. Matches in subject matter between the analytical problem and users contribute as factors in the Moderator Propensity Score, and lead to the designation of two team Moderators at this point in the workflow process—one for the Impute Crowd and one for the Refute Crowd.

Referring to FIG. 5, after the question classification phase, users are assigned roles in the analytic technique and the process moves to an Impute phase 550 implemented by the Impute component 150, which commences the analytical process, and includes a first Impute sub-process (Impute A) 551 and a second Impute sub-process (Impute B) 552. In the first Impute sub-process 551, the users assigned to the Impute Crowd (blue-team) and the Decision-Makers are presented with a Verification phase. In the second Impute sub-process 552, users assigned to the Impute Crowd and the Decision-Makers can gather information from sources including but not limited to a curated list of links, search engines, etc. In some instances, users must gather and sort information that pertains to political subject matter 553, economic subject matter 554, security and defense subject matter 555, and socio-cultural subject matter 556. Users can generate a wiki template at 557 via the Impute component of the system, and can generate scenario templates at 558.

Referring to FIGS. 5, 8-10, in Impute phase, the Decision-Maker begins in the Impute A sub-section which consists of Verification. In Verification, embodied by FIG. 8 components 812, 814, 816, 818, 820, 822 and 824 and FIGS. 10A-B components 1000, 1001, 1002, 1003, 1004, 1005, and 1006, the Decision-Maker is asked a series of questions 810, 1000, 1001, 1002, 1003, 1004, 1005, and 1006, regarding the problem that ends with the Decision-Maker drafting an initial hypothesis and an initial contrarian (or countervailing) hypothesis to answer the analytical problem, accompanied with concise reasoning for each of the two hypotheses, possible biases, and confidence ratings expressed as probability estimates that the users' stated hypotheses and reasoning are correct. Within Verification are seven sub-sections the Decision-Maker follows to establish evidence supporting the reasoning and hypotheses:

a. Veracity: Is the information source identified and credible? (denoted as 812 in FIGS. 8 and 1000 in FIG. 10A)

b. What?: What key assumptions can be made about the analytical problem and which are made from fact, versus judgment, versus description, versus generalization? (denoted as 814 in FIGS. 8 and 1001 in FIG. 10A)

c. Who?: Identify key actors (denoted as 816 in FIGS. 8 and 1002 in FIG. 10A)

d. Where?: Is location relevant to solving the problem? (denoted as 818 in FIGS. 8 and 1003 in FIG. 10B)

e. When?: Is time relevant to solving the problem? (denoted as 820 in FIGS. 8 and 1004 in FIG. 10B)

f. Why?: Identify objectives, motivations, authority, legitimacy, competency and interests of key actors identified in Who? (denoted as 822 in FIGS. 8 and 9 and 1005 in FIG. 10B)

g. Whoa!—Do you have all the information you need to solve the problem? (denoted as 824 in FIGS. 8 and 1006 in FIG. 10B)

Figure 9:
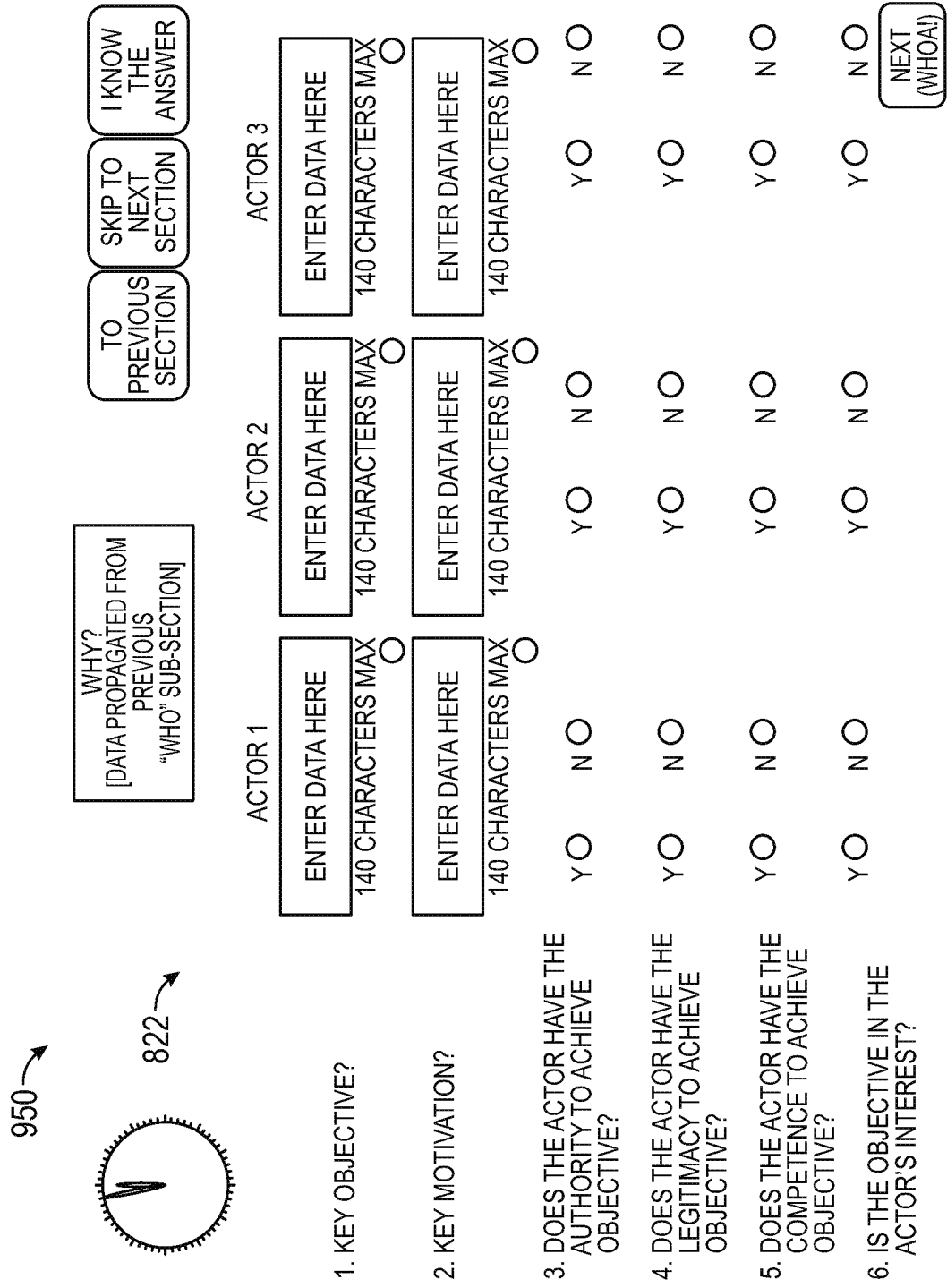
FIG. 9 depicts a window that can be generated to provide a detailed view of an aspect of the "Why?" sub-segment in the Verification segment of an embodiment of the Impute A phase.
Figure 10A:
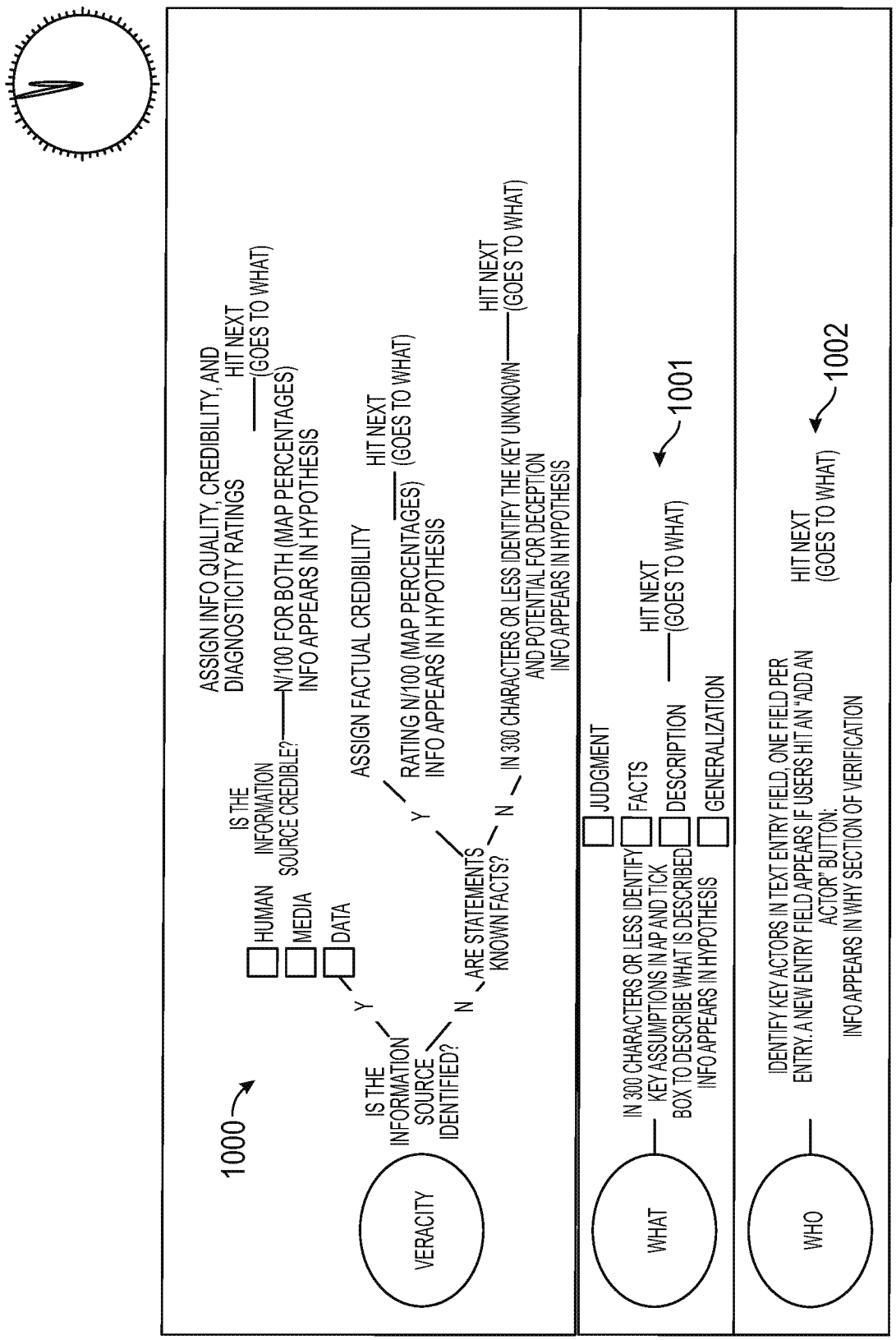
FIGS. 10A-B show a more detailed view of an aspect of an embodiment of the Verification sub-segment of the Impute phase.
Figure 10B:
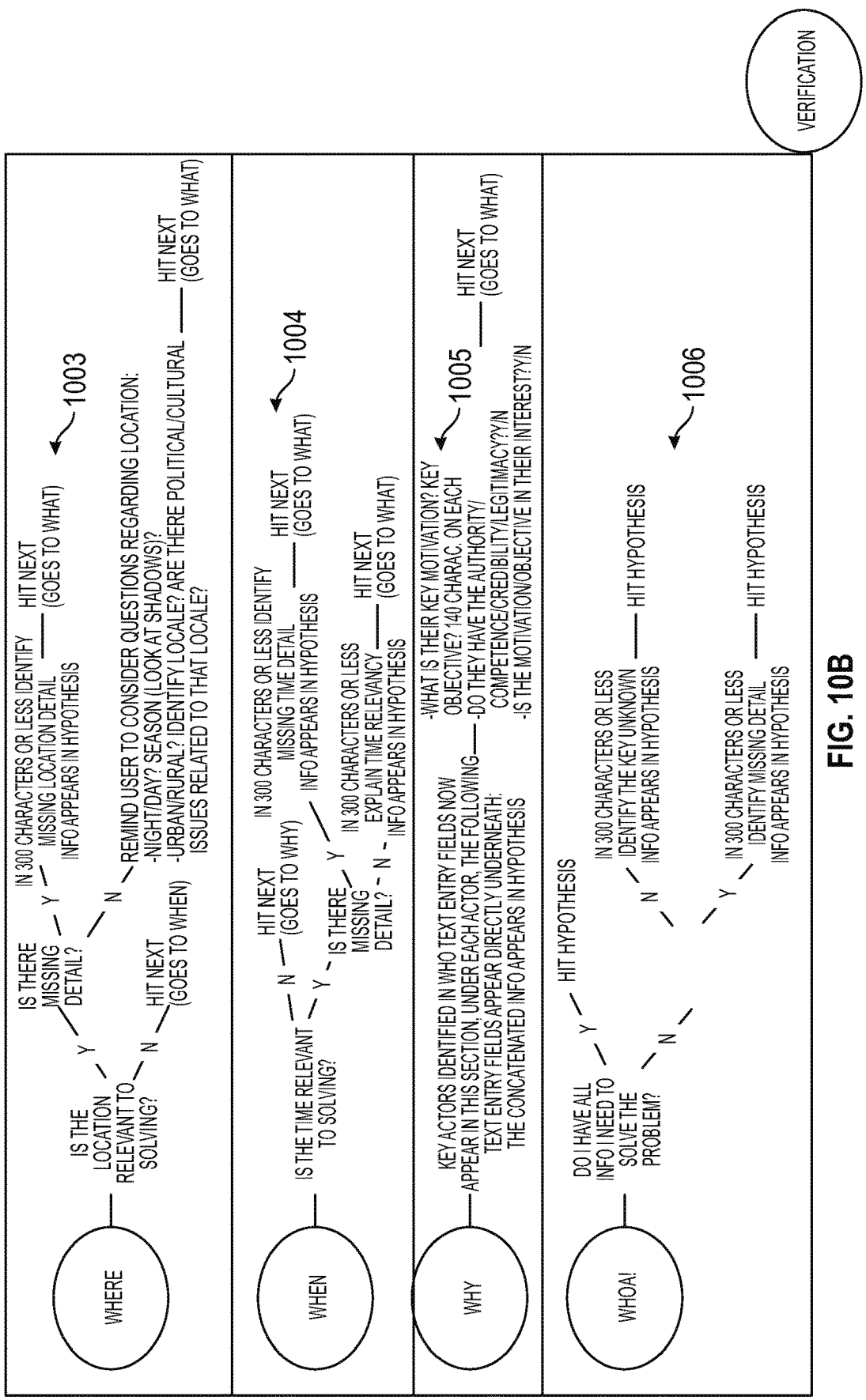
Figure 11:
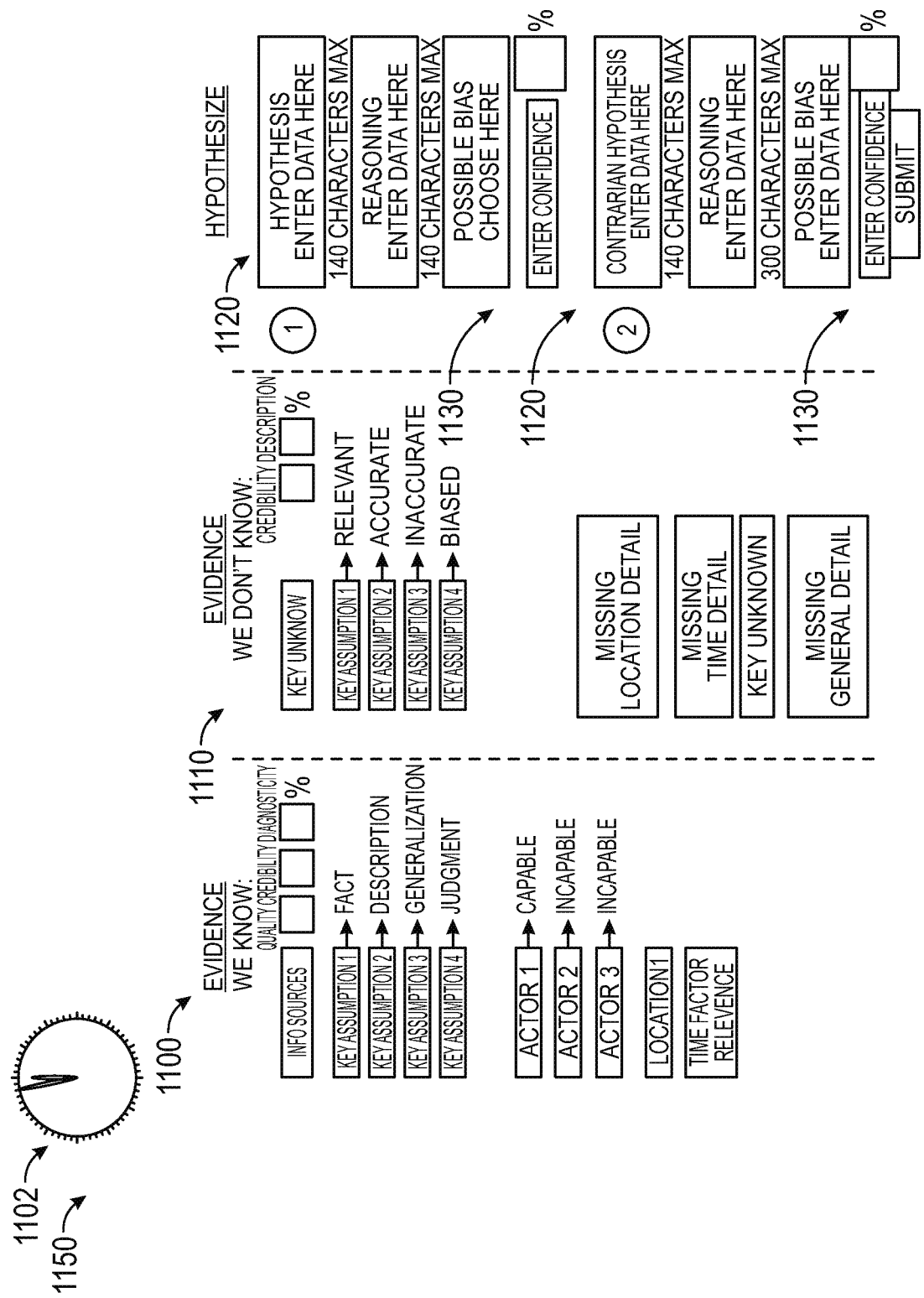
FIG. 11 depicts a window that can be generated to provide a detailed view of an aspect of the Individual Hypothesis Deliberation sub-segment of Impute A of an embodiment of the Impute phase

FIG. 9 depicts an exemplary window 950 in the component 822 of the verification subsection associated with the "Why?" is rendered. FIGS. 10A-B illustrate exemplary decision trees 1000-1006 that can be followed by the users to complete the Veracity, What, Who, Where, When, Why, and Whoa verification subsections, respectively.

Separately and simultaneously the individuals that make up Impute A Crowd also undergo the same Verification process as Decision-Makers with each member of Impute A Crowd individually recording their own hypothesis and contrarian hypotheses, along with accompanying reasoning, possible biases and confidence ratings. For example, the users assigned to the Impute A Crowd and the Decision Makers can be presented with as summary of known and unknown evidence 1100 and 1110 respectively, taken from the answers both individual Impute Crowd members and Decision-Makers supply in the Verification sub-segment as embodied in FIG. 8 and FIGS. 10A-B. In this individual hypothesis section embodied in a window 1150 shown in FIG. 11, Decision-Makers and Impute Crowd members can individually generate a hypotheses 1120 and confidence ratings 1130. The window 1150 can be rendered on user devices associated with the Impute Crowd and the Decision-Makers by the one or more servers executing the Impute component 150. The window 1150 can also include a graphical representation 1102 of the continuous clock functionality implemented by the one or more servers executing the system to provide a time remaining in the Impute phase 550. In the case of the Decision-Maker, these results are subsequently recorded as the Decision-Maker's first draft estimate. In the case of the Impute A Crowd members, these results are subsequently returned to the Impute Crowd to allow the Impute Crowd to assess their analytics as a group, as embodied by a window 1260 shown in FIG. 12; each member in the Impute Crowd can see how other Impute Crowd members have evaluated the evidence individually and are given a limited time to discuss and deliberate each other's responses collectively to update their own analysis, and then record a final collective Impute Crowd hypothesis with associated confidence estimate.

After the appropriate configurable time period associated with Impute phase 550 lapses, the Impute Crowd Moderator (selected using the Moderator Propensity Score) records the final hypothesis and each individual crowd member individually registers their confidence ratings regarding the group hypothesis separately. Subsequently, Impute A Crowd responses (the group's and individuals' scores) are recorded and returned to Decision-Makers so that Decision-Makers may choose to revise their own draft estimate after reviewing Impute A Crowd estimates. If Decision-Makers are permitted to gather outside information, they can augment their analysis by conducting information searches using a list of curated high quality information sources, as well as any number of mechanisms, including search engines, etc. Information gleaned from the Question Classification component aids in information gathering at this stage. If Decision-Makers are required to analyze problems with less knowable outcomes, they are directed through Impute B, where they work directly with the Impute Crowd, as opposed to separately as in Impute A. Together they first gather information as a team in Base Rate and then process information gathering through a taxonomy of Political, Economic, Security, and Socio-Cultural forces. Impute B participants led by the Impute Crowd Moderator then generate a curated wiki template that guides them through discussion to determine the best response as a group, along with reasoning, possible biases and confidence ratings before recording the final response that concludes Impute B workflow process. If scenarios are required to conclude the workflow process, Impute B participants as an integrated crowd led by the Impute Crowd Moderator generate scenarios with drivers, matrix and scenario canvas templates, the latter with associated confidence ratings that serve as the final response in the Impute stage if scenarios or similar narrative and graphic responses are required.

Figure 12:
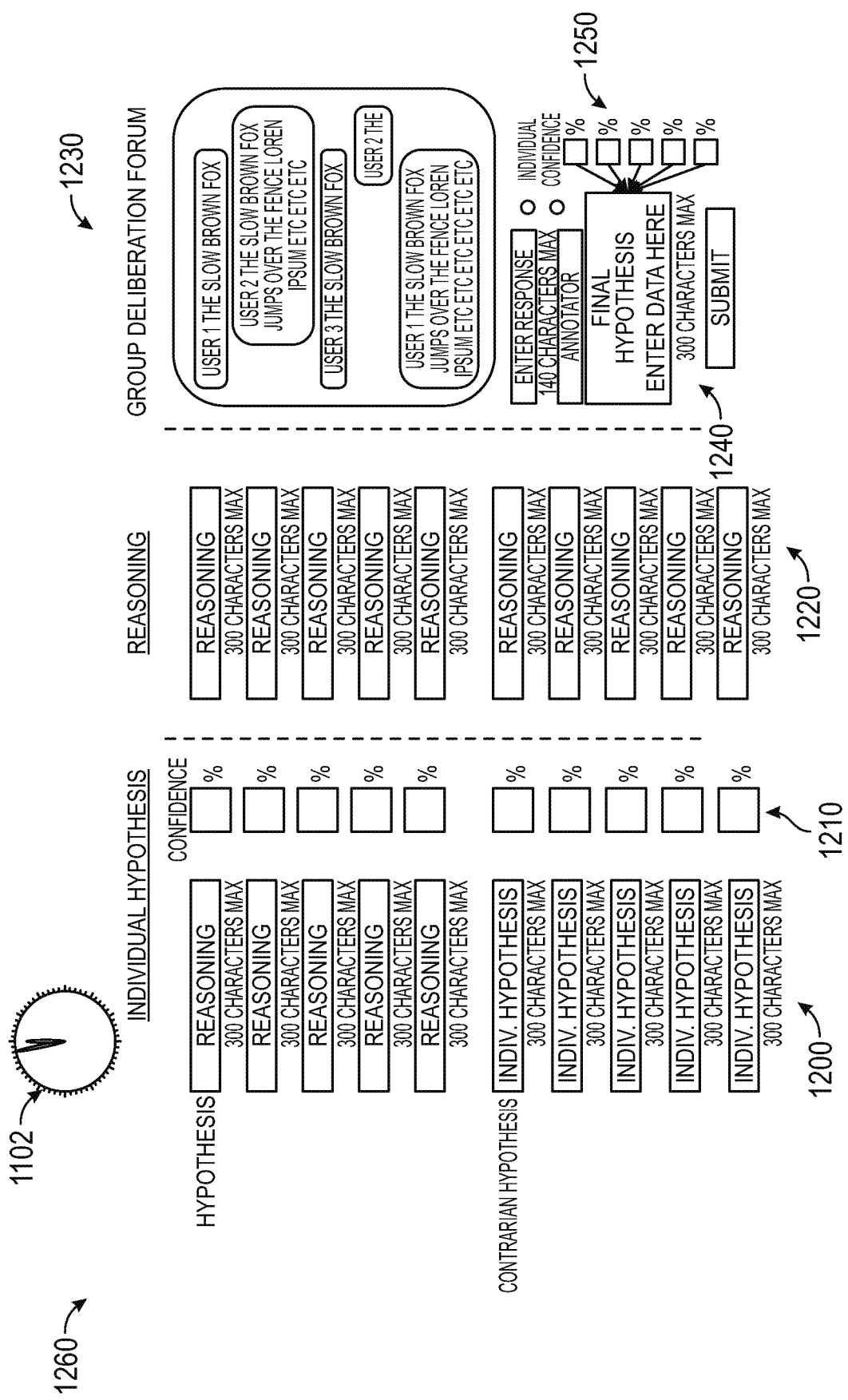
FIG. 12 depicts a window that can be generated to provide a detailed view of an aspect of the Group Hypothesis Deliberation sub-segment of Impute A of an embodiment of the Impute phase.

FIG. 12 shows the window 1260 providing an exemplary group hypothesis deliberation section that can be provided by the system to facilitate the Impute A sub-process 551 implemented by the Impute component 150 shown in FIG. 1. The section provides a hypothesis 1200 and confidence rating 1210 from each member of the Impute Crowd, as well as their reasoning 1220 for choosing their hypothesis such that the text information received from each user device associated with a member of the Impute Crowd in the window 1150 is relocated to the window 1260. Each member of the Impute Crowd can simultaneously view and interact with the window 1260. In addition, a live/contemporaneous forum 1230 can be embedded in the section through which the users of the Impute Crowd can correspond in computer-mediated synchronous communication (e.g., via a text-based messages to discuss the hypotheses and the reasoning). The Moderator of the Impute Crowd can moderate the forum and ultimately select a final hypothesis 1240 for the group. In response to selection of the final hypothesis, each user assigned to the Impute Crowd is asked to provide their confidence rating 1250 in relation to the final hypothesis. The window 1260 can also include the graphical representation 1102 of the continuous clock functionality implemented by the one or more servers executing the system to provide a time remaining in the Impute phase 550.

Figure 13:
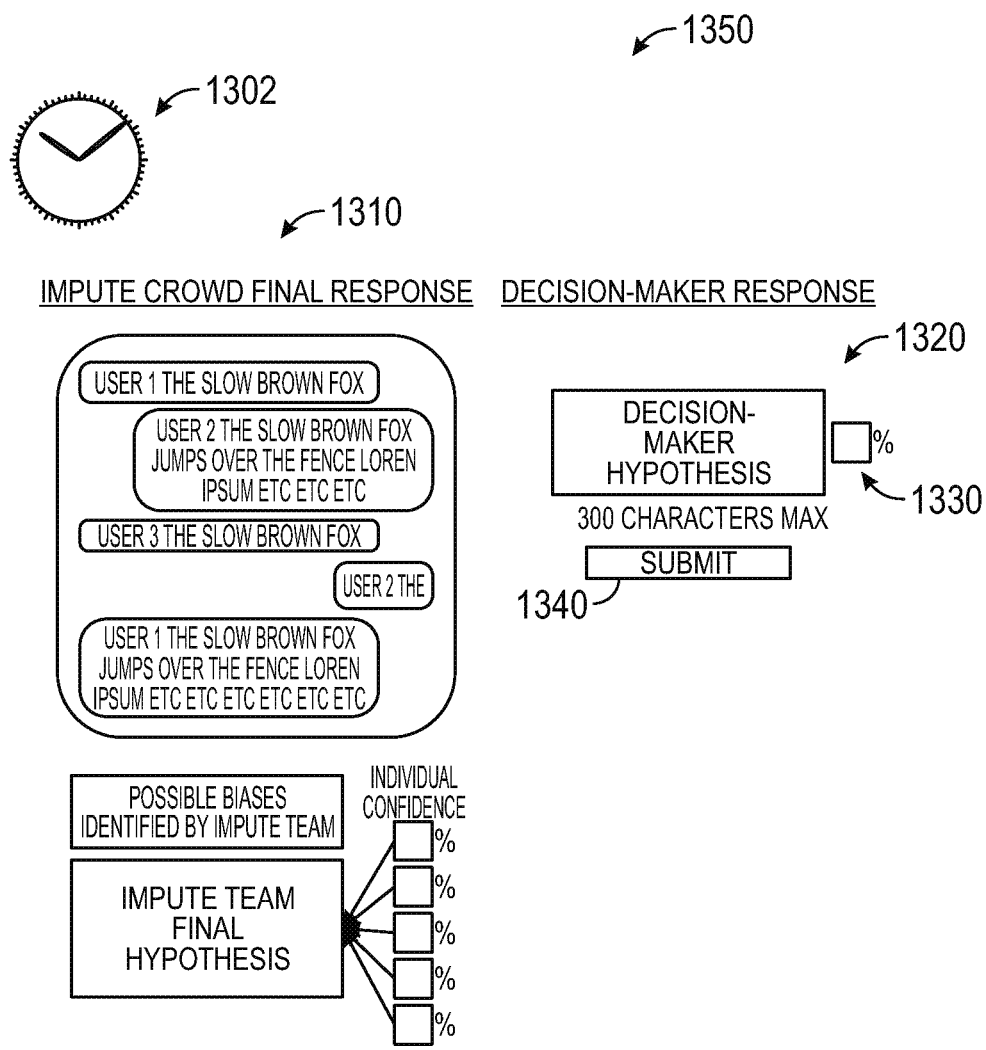
FIG. 13 depicts a window that can be generated to provide a detailed view of an aspect of an initial Decision-Maker hypothesis process after the Impute phase.

At the end of the Impute phase 550 (e.g., when the time interval associated with the Impute phase expires), a window 1350 shown in FIG. 13 can be rendered on the user device(s) associated with the Decision-Makers. Text information from windows associated with the Impute phase 550 can be relocated to the window 1350. The window 1350 cannot be seen by the Impute Crowd or the Refute Crowd. As one example, the window 1350 can include a record 1310 of the dialogue between the Impute Crowd captured via the live/contemporaneous forum 1230 shown in FIG. 12 and can include the final group hypothesis 1240 and confidence rating 1260 of the Impute Crowd shown in FIG. 12. The window 1350 can provide an area in which the Decision-Makers can enter a Decision-Maker draft hypothesis 1320 and a preliminary confidence rating 1330, which can be informed by the record 1310. The Decision-Maker can submit the Decision-Maker draft hypothesis 1320 and the preliminary confidence rating 1330 by selecting the submit button 1340. The window 1350 can also include a graphical representation 1302 of the continuous clock functionality that can be implemented by the one or more servers executing the system to provide a time remaining for the Decision-Makers initial hypothesis before the workflow process proceeds to the Refute phase 560.

Referring again to FIG. 5, the Refute phase 560 begins after the Impute phase 550 and the Decision-Makers submitted the Decision-Maker draft hypothesis 1320 and a preliminary confidence rating 1330. The generated results of both Impute A and Impute B are sent onwards to the Refute Crowd in the Refute phase 560, which is implemented by the Refute component 160 shown in FIG. 1. The Refute Crowd includes a different dedicated crowd than the Impute Crowd to act as a red-team devil's advocate on the results generated from the Impute phase 550. In the Refute phase 560, the Refute Crowd assesses the quality of thinking and analysis done by both Decision-Makers and Crowds in Impute by identifying: 1. Information Gaps & Vulnerable Assumptions; 2. Unobserved Norms And Protocols That Will Affect The Answer 3. Wishful Thinking In Analysis 4. Biases And Poor Metacognitive Practice. As does the Impute Crowd, the Refute Crowd records its own hypothesis and confidence estimates, both at the individual (using a window that is similar to the window 1150 shown in FIG. 11) and group level (using a window 1450 shown in FIG. 14), which is sent to Decision-Maker and rendered in a window 1350' as shown in FIG. 15 prior to recording of the final response and the conclusion of the workflow process. If Refute's hypothesis and confidence ratings are within a threshold of agreement with the Impute analysis, Decision-Makers are prompted to record a final answer to the problem, with final confidence ratings, at 570. If Refute's hypothesis and confidence scoring is outside a threshold of agreement with the Impute analysis, Decision-Makers are prevented from recording a final response and are directed to start the Impute process one more time to review information and thinking and revise their scores if required. Before they are sent back into Impute, Decision-Makers will be prompted to select and review De-Biasing Training individual modules if they wish. Their Metacognition Scores will be updated if they choose to review any modules. Once they pass through De-Biasing Training, Decision-Makers make a second and final pass at Impute, this time without the Crowd, before recording a final answer. The second pass does not go through Refute a second time. The crowd-sourced and binary blue-team/red-team structure of Impute/Refute analysis is designed to draw users through an iterative analytical process in which crowd-aided knowledge assists in the formation of causal and predictive assessments through both information augmentation (Impute) and falsification (Refute) processes.

Figure 14:
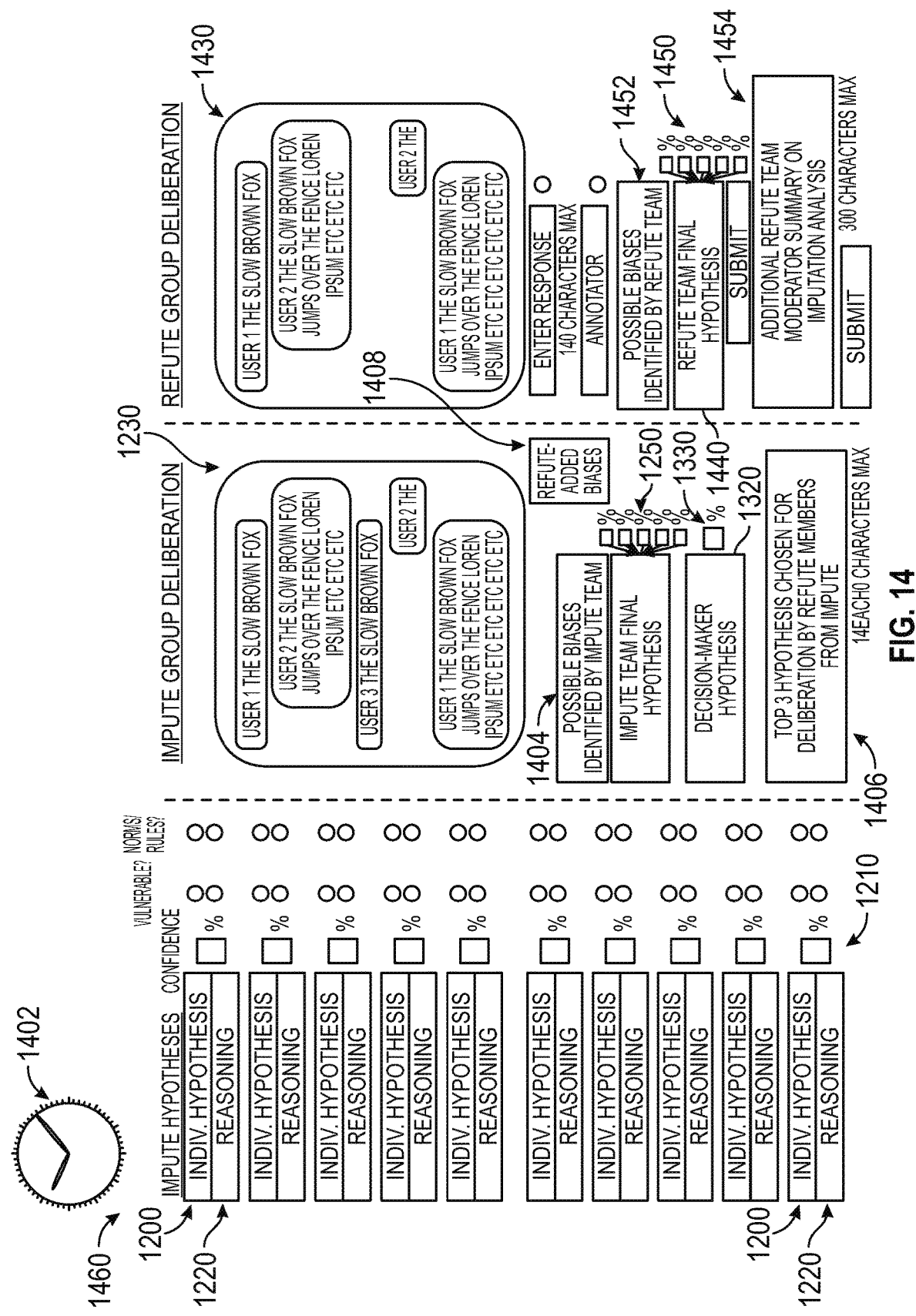
FIG. 14 depicts a window that can be generated to provide a detailed view of an aspect of the Group Hypothesis Deliberation of the Refute phase of an embodiment of the Refute phase.
Figure 15:
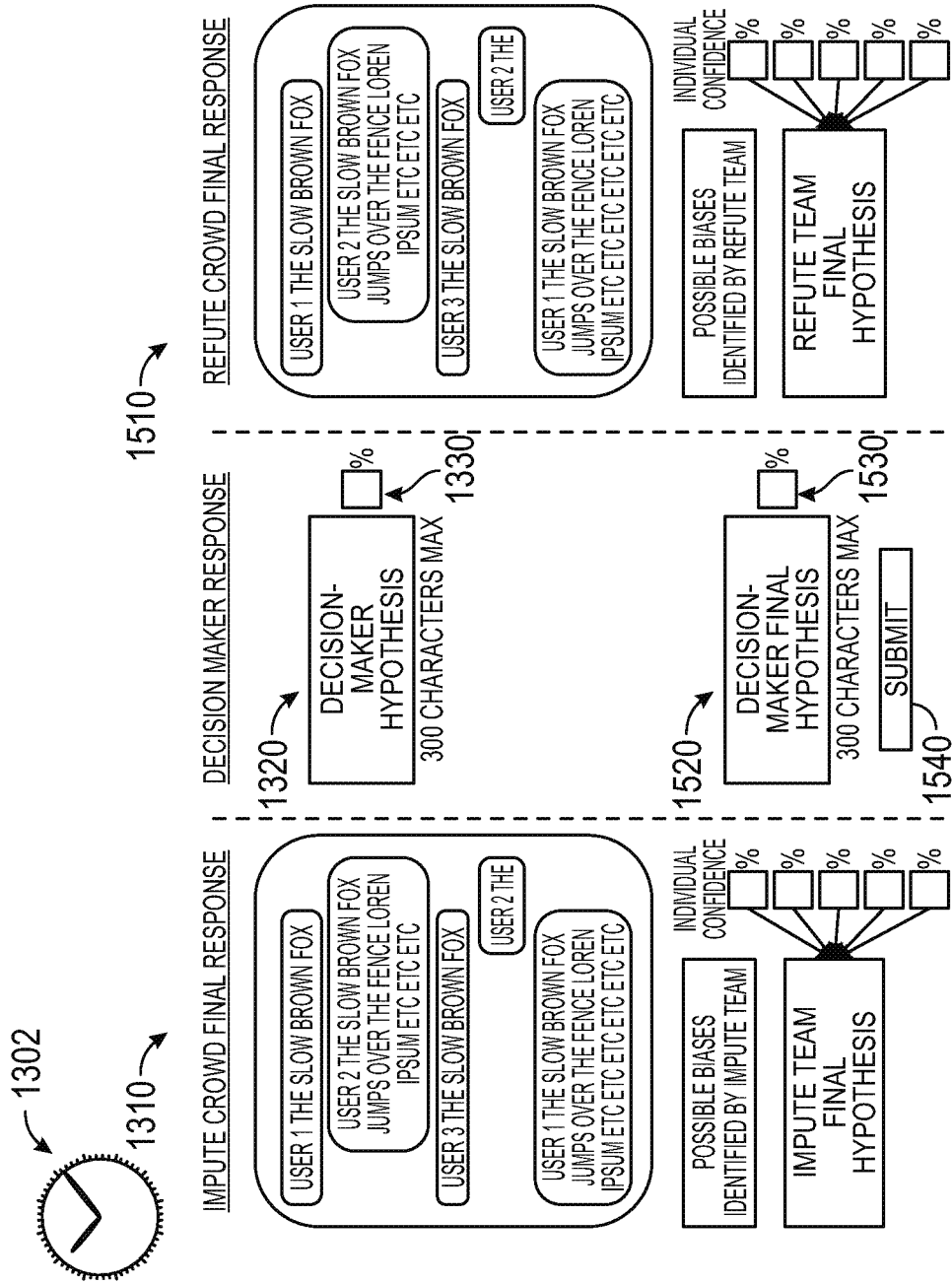
FIG. 15 depicts an update of the window shown in FIG. 13 that can be generated to provide a detailed view of an aspect of a final Decision-Maker hypothesis process after the Refute phase.

FIG. 14 depicts the window 1460 for the Refute Crowd group deliberation portion of the Refute phase 560 that can be generated by the one or more servers executing the system. Text information from the windows in the Impute phase 550 and the Decision-Makers draft response can be relocated to the window 1460 to provide a record that can inform the Refute Crowd's response. As one example, the individual hypotheses 1200, individual confidence ratings 1210, individual reasoning 1220, possible biases, a record of the live/contemporaneous forum 1230, the final hypothesis 1240, and confidence ratings 1250 associated with the final hypothesis 1240 from the windows 1150 and 1260 shown in FIGS. 11 and/or 12 can be included in the window 1460. As another example, the Decision-Maker draft hypothesis 1320 and the confidence rating 1330 from the window 1350 can be included in the window 1460. Additional fields of text information from other windows associated with the Impute phase 550 can also be included in the window 1460, such as possible biases 1404 identified by the Impute Crowd, a selection 1406 of individual hypotheses from Impute phase 550 to be deliberated by the Refute Crowd, and additional biases 1408 associated the Impute hypotheses entered by the Refute Crowd.

The window 1460 also includes a Refute Crowd group deliberation area. Each member of the Refute Crowd can simultaneously view and interact with the window 1460 via their respective user devices. In addition, a live/contemporaneous forum 1430 can be embedded in the window 1460 through which the members of the Refute Crowd can correspond in computer-mediated synchronous communication (e.g., via a text-based messages to discuss the hypotheses and the reasoning). The Moderator of the Refute Crowd can moderate the forum and ultimately select a final hypothesis 1440 for the group. In response to selection of the final hypothesis 1440, each user assigned to the Refute Crowd is asked to provide their confidence rating 1450 in relation to the final hypothesis 1440 as well as possible biases 1452 and a summary 1454 on the analysis performed by the Impute Crowd. The window 1460 can also include the graphical representation 1402 of the continuous clock functionality implemented by the one or more servers executing the system to provide a time remaining in the Refute phase 560. After the final hypothesis 1440, associated confidence ratings 1450, possible biases 1452, and summary 1454 are entered and the time interval associated with the Refute phase expires, the workflow process returns to the Decision-Maker.

FIG. 15 depicts the window 1350' after the Refute phase 560 is complete. The window 1350' represents an updated version of the window 1350 shown in FIG. 13 and can be viewed exclusively by the Decision-Makers via their user devices. The window 1350' includes the text information relocated from windows associated with the Impute phase 550 and includes text information relocated from the windows associated with the Refute phase 560. The window 1350' cannot be seen by the Impute Crowd or the Refute Crowd. As on example, the window 1350' can include the record 1310 of the dialogue between the Impute Crowd captured via the live/contemporaneous forum 1230 shown in FIG. 12 and can include the final group hypothesis 1240 and confidence rating 1250 shown in FIG. 12. The window 1350' can also include a record 1510 of the dialogue between the Refute Crowd captured via the live/contemporaneous forum 1430 shown in FIG. 14 and can include the final group hypothesis 1440 and confidence rating 1450 of the Refute Crowd shown in FIG. 14. The window 1350' can provide an area in which the Decision-Makers can enter a Decision-Maker final hypothesis 1520 and final confidence rating 1530, which can be informed by the records 1310 and 1510. The Decision-Maker can submit the Decision-Maker final hypothesis 1520 and the final confidence rating 1530 by selecting the submit button 1540. The window 1350' can also include the graphical representation 1302 of the continuous clock functionality that can be implemented by the one or more servers executing the system to provide a time remaining for the Decision-Makers final hypothesis before the workflow process ends.

Figure 16:
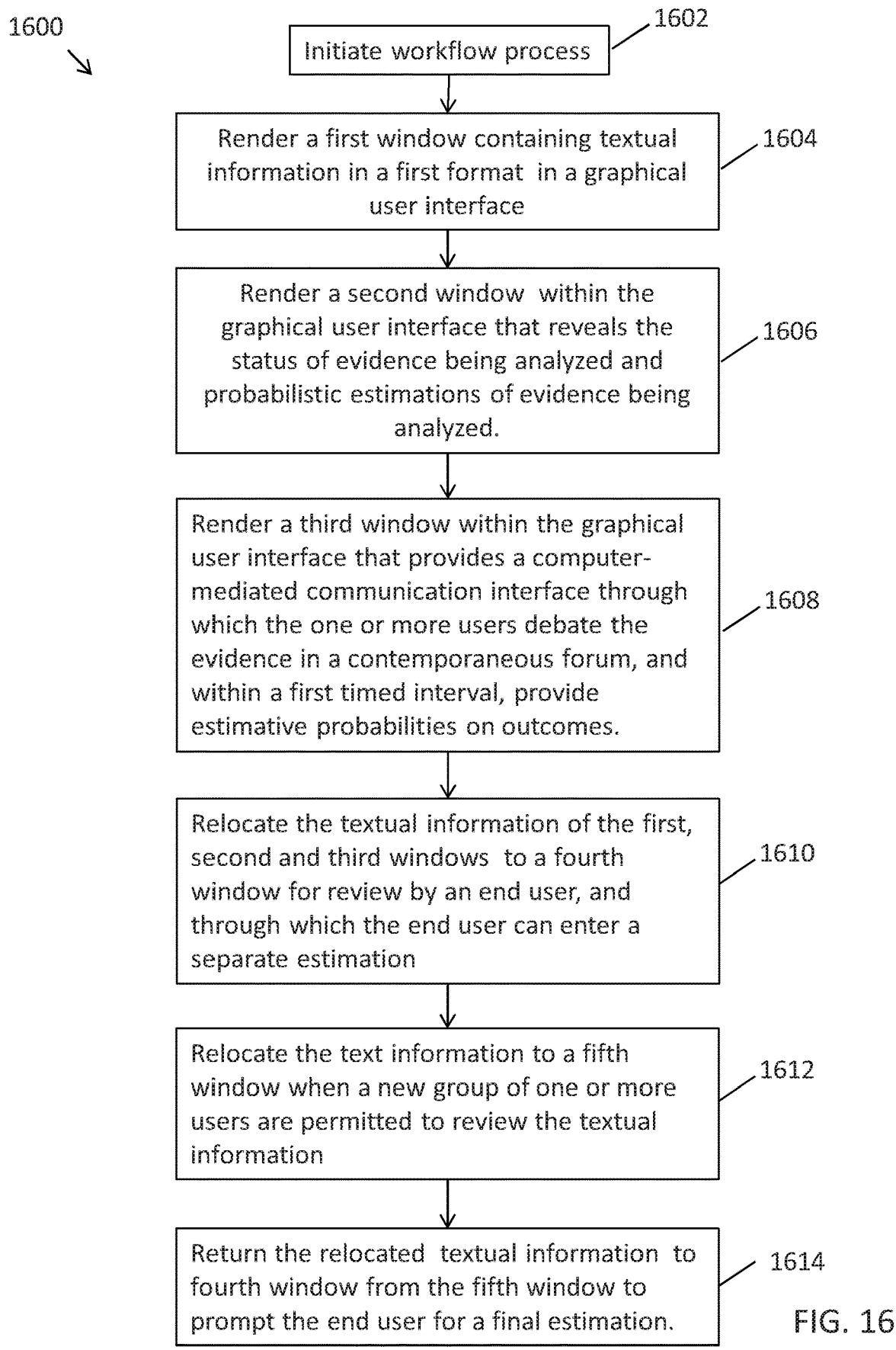
FIG. 16 is a flowchart that illustrates an example process for relocating content between windows in a graphical user interface in accordance with embodiments of the present disclosure.

FIG. 16 is a flowchart illustrating an example process 1600 for dynamically relocating textual information within an underlying window displayed in a graphical user interface. In operation 1602, a workflow process is initiated by a processor. In operation 1604, a first window containing textual information in a first format is rendered within a graphical user interface on a display of a computing device. The textual information guides one or more users through a review of evidence. In operation 1606, a second window is rendered within the graphical user interface that reveals the status of evidence being analyzed and probabilistic estimates of evidence being analyzed. In operation 1608, a third window is rendered within the graphical user interface that provides a computer-mediated communication interface through which the one or more users debate the evidence in a contemporaneous forum, and within a first timed interval, provide probability estimates on hypothesized outcomes. The first timed interval is implemented by a continuous clock functionality that monitors the timing of the first, second, and third windows. In operation 1610, the textual information of the first, second, and third windows is relocated, by a processor, to a fourth window for review by the Decision-Maker end user, and through which the end user can enter a separate estimate. The text information is automatically relocated to the fourth window upon expiration of the first timed interval. In operation 1612, the text information is relocated to a fifth window when a new group of one or more users are permitted to review the textual information. The new group of one or more users is permitted to review the textual information upon expiration of a second timed interval, after which the new group of one or more users generates a group estimate. In operation 1614, the relocated textual information is returned, by the processor, from the fifth window back to the fourth window to prompt the end user for a final estimate.

Figure 17:
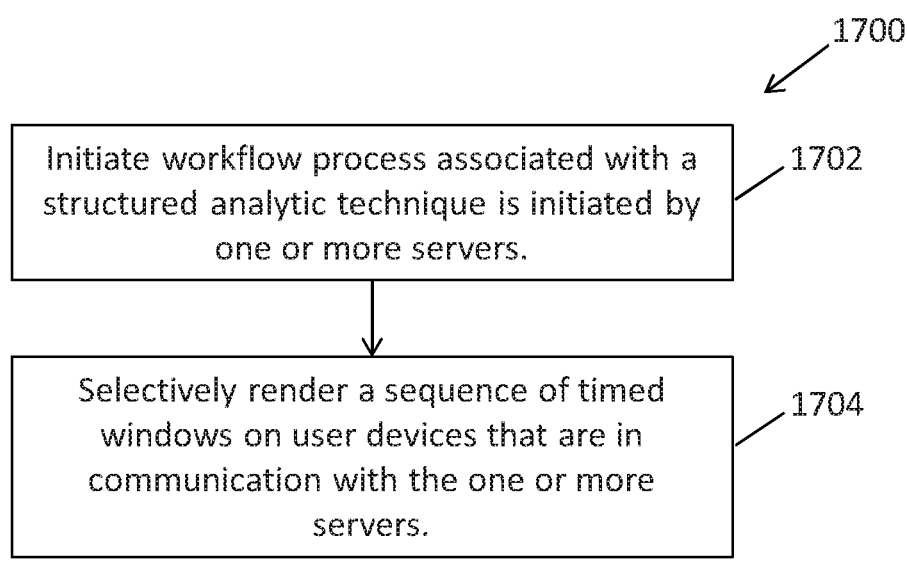
FIG. 17 is a flowchart illustrating an example process for dynamically displaying textual information within windows of one or more graphical user interfaces of a multi-user distributed environment.

FIG. 17 is a flowchart illustrating an example process 1700 for dynamically displaying textual information within windows of one or more graphical user interfaces of a multi-user distributed environment. In operation 1702, a workflow process associated with a structured analytic technique is initiated by one or more servers. In response to initiation of the workflow process the one or more servers can create a collaborative data space based on data stored in one or more databases. In operation 1704, a sequence of timed windows can be selectively rendered on user devices that are in communication with the one or more servers. The timed windows can be created by the one or more servers based on the collaborative data space and according to a continuous clock functionality being executed by the one or more servers in response to execution of workflow process. The sequence of timed windows can be rendered on the user devices to include automatic relocation of text information between the timed windows upon expiration of specified time intervals and the timed windows can be rendered on different groups of the user devices based on the continuous clock function.

The sequence of time windows can include a first window containing textual information from the collaborative data space. The first window can be rendered on a first group of the user devices. The textual information can guide the users of the first group (e.g., the Impute Crowd) of the user devices through a review of evidence. For example, the textual information in the first window can guide the one or more users through a verification review of evidence. A second window can be rendered on the first group of user devices. The second window can reveal the status of evidence being analyzed and probabilistic estimates of evidence being analyzed. A third window can be rendered on the first group of user devices and can provide a computer-mediated synchronous communication interface through which the users of the first group of the user devices debate the evidence in a contemporaneous forum, and within a first timed interval, provide probability estimates on hypothesized outcomes. The first timed interval can be implemented by the continuous clock functionality. The textual information of the first, second and third windows can be relocated by the one or more servers to a fourth window automatically upon expiration of the first timed interval. The fourth window can be rendered on a second group including one or more of the user devices associated with one or more end users. The first and second groups of users can be mutually exclusive from each other. The textual information is relocated to the fourth window for review by the one or more end users (i.e. Decision-Makers) associated with the one or more user devices in the second group independent of the first group of the user devices. The fourth window can be configured to receive a separate estimate. The text information can be relocated to a fifth window when a new group of one or more users (e.g., the Refute Crowd) are permitted to review the textual information. The new group of one or more users can be permitted to review the textual information upon expiration of a second timed interval. The new group of one or more users can generate a group estimate. The relocated textual information can be returned by the one or more servers from the fifth window back to the fourth window to prompt the end user for a final estimate. The user device associated with the end user can be automatically routed to the beginning of the workflow process in response to a specified degree of disparity in the final estimate and the group estimate.

Figure 18:
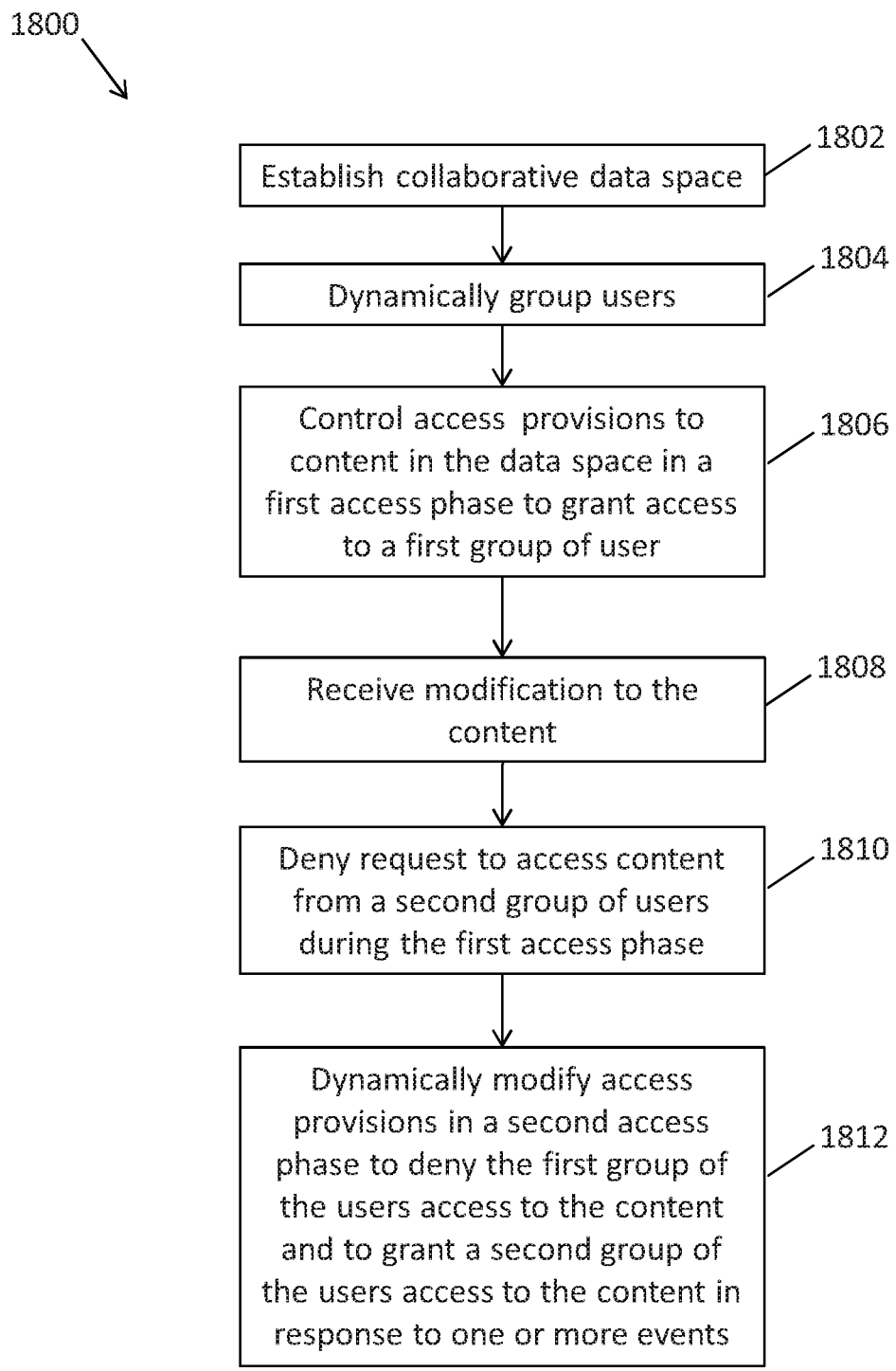
FIG. 18 is a flowchart that illustrates an example process for controlling access to a collaborative data space and content associated therewith in accordance with embodiments of the present disclosure.

FIG. 18 is a flowchart illustrating an example process 1800 for controlling access provisions in a multi-user, collaborative computer environment. In operation 1802, a collaborative data space that is simultaneously accessible by users over a communication network is established by one or more servers. In operation 1804, at least a subset of the users is dynamically clustered into groups. In operation 1806, access provisions to content in the collaborative data space are controlled in a first access phase to grant a first group of the users access to the content and to deny a second group of the users access to the content. In operation 1808, input in the collaborative data space is received from the first group of the users to collaboratively modify the content of the data space in the first access phase. In operation 1810, requests to access the content of the collaborative data space from the second group of the users is denied in the first access phase. In operation 1812, the access provisions to the content in the collaborative data space is dynamically modified in a second access phase to deny the first group of the users access to the content and to grant a second group of the users access to the content in response to a configurable amount of time that has elapsed since the first group of users was provided access to the content of the collaborative data space, or in response to an action of at least one of the users in the first group and after collaborative modification to the content of the collaborative data space is committed to a database.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of the particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

The invention claimed is:

1. A method of controlling access provisions in a multi-user, collaborative computer environment, the method comprising:

initiating a workflow process associated with a structured analytic technique by one or more servers;

establishing, by the one or more servers in response to initiating the workflow process, a collaborative data space that is simultaneously accessible by users over a communication network;

dynamically grouping at least a subset of the users into groups, the groups including at least a first group of the users and a second group of the users;

rendering, selectively, a sequence of timed windows on user devices in communication with the one or more servers through which input from the first group of the users and the second group of the users is received and according to a continuous clock functionality being executed by the one or more servers in response to execution of the workflow process;

controlling access provisions to content in the collaborative data space in a first access phase to grant the first group of the users access to the content and to deny the second group of the users access to the content;

receiving input in the collaborative data space from the first group of users via the timed windows to collaboratively modify the content of the data space in the first access phase;

preventing access to the content of the collaborative data space from the second group of the users in the first access phase; and dynamically modifying the access provisions to the content in the collaborative data space in a second access phase to deny the first group of the users access to the content and to grant the second group of the users access to the content in response to a configurable amount of time that has elapsed since the first group of users was provided access to the content of the collaborative data space or in response to an action of at least one of the users in the first group and after collaborative modification to the content of the collaborate data space is committed to a database, wherein rendering the sequence of timed windows on the user devices includes automatically relocating text information between the timed windows upon expiration of specified time intervals, and wherein the timed windows are rendered on the user devices of the first group of the users or the second group of the users based on the continuous clock function to grant or deny access to the content in the collaborative data space.

2. The method of claim 1, wherein rendering the sequence of time windows includes:

rendering a first window containing textual information from the collaborative data space, the first window being rendered on the user devices associated with the first group of the users, the textual information guiding the users of the first group through a review of evidence;

rendering a second window on the user devices associated with the first group of users, the second window revealing the status of evidence being analyzed and probabilistic estimates of evidence being analyzed; and rendering a third window on the user devices of the first group of users that provides a computer-mediated synchronous communication interface through which the users of the first group debate the evidence in a contemporaneous forum, and within a first timed interval, provide probability estimates on hypothesized outcomes, the first timed interval being implemented by the continuous clock functionality.

3. The method of claim 2, further comprising:

relocating the textual information of the first, second and third windows, by the one or more servers, to a fourth window automatically upon expiration of the first timed interval, the fourth window being rendered on the user devices associated with the second group of the users, one or more of the users in the second group being one or more end users, the first and second groups being mutually exclusive from each other, the textual information is relocated to the fourth window for review by the one or more end users in the second group independent of the first group of the users, the fourth window being configured to receive a separate estimate.

4. The method of claim 3, further comprising:

relocating the text information to a fifth window when a new group of one or more users are permitted to review the textual information, the new group of one or more users being permitted to review the textual information upon expiration of a second timed interval, the new group of one or more users generating a group estimate.

5. The method of claim 4, further comprising:

returning the relocated textual information, by the processor, from the fifth window back to the fourth window to prompt the one or more end users for a final estimate.

6. The method of claim 5, further comprising:

in response to a specified degree of disparity in the final estimate and the group estimate, automatically routing the one or more end users to the beginning of the workflow process.

7. The method of claim 3, wherein the textual information analyzed by the users in the first, second and third windows is presented as evidence to the one or more end users in the fourth window allowing the one or more end users to take into account the evidence analyzed by the one or more users in the first, second and third windows.

8. The method of claim 7, wherein the workflow process does not require the one or more end users to take into account the evidence analyzed by the one or more users in the first, second and third windows.

9. The method of claim 2, wherein the textual information in the first window guides the one or more users within the graphical user interface through a verification review of evidence.

10. The method of claim 2, further comprising:

scoring the probability estimates on the hypothesized outcomes on the basis of accuracy after answers have been revealed.

11. A system controlling access provisions in a multi-user, collaborative computer environment, the system comprising:

one or more non-transitory computer-readable medium storing instructions executable by one or more servers and a collaborative data space;

one or more servers, the one or more servers execute the instructions to:

initiate a workflow process associated with a structured analytic technique;

establish, in response to initiating the workflow process, the collaborative data space in the one or more computer-readable media, the collaborative data space being simultaneously accessible by users over a communication network;

dynamically group at least a subset of the users into groups, the groups including at least a first group of the users and a second group of the users;

render, selectively, a sequence of timed windows on user devices in communication with the one or more servers through which input from the first group of the users and the second group of the users is received and according to a continuous clock functionality being executed by the one or more servers in response to execution of the workflow process;

control access provisions to content in the collaborative data space in a first access phase to grant the first group of the users access to the content and to deny the second group of the users access to the content;

receive input in the collaborative data space from the first group of users via the timed windows to collaboratively modify the content of the data space in the first access phase;

prevent access to the content of the collaborative data space from the second group of the users in the first access phase; and dynamically modify the access provisions to the content in the collaborative data space in a second access phase to deny the first group of the users access to the content and to grant the second group of the users access to the content in response to a configurable amount of time that has elapsed since the first group of users was provided access to the content of the collaborative data space or in response to an action of at least one of the users in the first group and after collaborative modification to the content of the collaborate data space is committed to a database, wherein the sequence of timed windows is rendered on the user devices to include automatically relocating text information between the timed windows upon expiration of specified time intervals, and wherein the timed windows are rendered on the user devices of the first group of the users or the second group of the users based on the continuous clock function to grant or deny access to the content in the collaborative data space.

12. The system of claim 11, wherein the sequence of time windows are rendered to include:

a first window containing textual information from the collaborative data space, the first window being rendered on the user devices associated with the first group of the users, the textual information guiding the users of the first group through a review of evidence;

a second window on the user devices associated with the first group of users, the second window revealing the status of evidence being analyzed and probabilistic estimates of evidence being analyzed; and a third window on the user devices of the first group of users that provides a computer-mediated synchronous communication interface through which the users of the first group debate the evidence in a contemporaneous forum, and within a first timed interval, provide probability estimates on hypothesized outcomes, the first timed interval being implemented by the continuous clock functionality.

13. The system of claim 12, wherein the one or more servers are programmed to:

relocate the textual information of the first, second and third windows, by the one or more servers, to a fourth window automatically upon expiration of the first timed interval, the fourth window being rendered on the user devices associated with the second group of the users, one or more of the users in the second group being one or more end users, the first and second groups being mutually exclusive from each other, the textual information is relocated to the fourth window for review by the one or more end users in the second group independent of the first group of the users, the fourth window being configured to receive a separate estimate.

14. The system of claim 13, wherein the one or more servers are programmed to:

relocate the text information to a fifth window when a new group of one or more users are permitted to review the textual information, the new group of one or more users being permitted to review the textual information upon expiration of a second timed interval, the new group of one or more users generating a group estimate.

15. The system of claim 14, wherein the one or more servers are programmed to:

return the relocated textual information, by the processor, from the fifth window back to the fourth window to prompt the one or more end users for a final estimate.

16. The system of claim 15, wherein, in response to a specified degree of disparity in the final estimate and the group estimate, the one or more servers are programmed to automatically route the one or more end users to the beginning of the workflow process.

17. The system of claim 13, wherein the textual information analyzed by the users in the first, second and third windows is presented as evidence to the one or more end users in the fourth window allowing the one or more end users to take into account the evidence analyzed by the one or more users in the first, second and third windows, and wherein the workflow process does not require the one or more end users to take into account the evidence analyzed by the one or more users in the first, second and third windows.

18. The system of claim 12, wherein the textual information in the first window guides the one or more users within the graphical user interface through a verification review of evidence.

19. The system of claim 12, wherein the probability estimates on the hypothesized outcomes are scored on the basis of accuracy after answers have been revealed.

20. A non-transitory computer-readable medium comprising instructions executable by a processing device, wherein execution of the instructions by the processing device causes the processing device to:

initiate a workflow process associated with a structured analytic technique;

establish, in response to initiating the workflow process, the collaborative data space in the one or more computer-readable media, the collaborative data space being simultaneously accessible by users over a communication network;

dynamically group at least a subset of the users into groups, the groups including at least a first group of the users and a second group of the users;

render, selectively, a sequence of timed windows on user devices in communication with the one or more servers through which input from the first group of the users and the second group of the users is received and according to a continuous clock functionality being executed by the one or more servers in response to execution of the workflow process;

control access provisions to content in the collaborative data space in a first access phase to grant the first group of the users access to the content and to deny the second group of the users access to the content;

receive input in the collaborative data space from the first group of users via the timed windows to collaboratively modify the content of the data space in the first access phase;

prevent access to the content of the collaborative data space from the second group of the users in the first access phase; and dynamically modify the access provisions to the content in the collaborative data space in a second access phase to deny the first group of the users access to the content and to grant the second group of the users access to the content in response to a configurable amount of time that has elapsed since the first group of users was provided access to the content of the collaborative data space or in response to an action of at least one of the users in the first group and after collaborative modification to the content of the collaborate data space is committed to a database, wherein the sequence of timed windows is rendered on the user devices to include automatically relocating text information between the timed windows upon expiration of specified time intervals, and wherein the timed windows are rendered on the user devices of the first group of the users or the second group of the users based on the continuous clock function to grant or deny access to the content in the collaborative data space.

* * * * *